United States Patent
Kim et al.

(10) Patent No.: US 9,859,027 B2
(45) Date of Patent: Jan. 2, 2018

(54) MULTI STAGE SAFETY INJECTION DEVICE AND PASSIVE SAFETY INJECTION SYSTEM HAVING THE SAME

(71) Applicant: KOREA ATOMIC ENERGY RESEARCH INSTITUTE, Daejeon (KR)

(72) Inventors: Young In Kim, Daejeon (KR); Won Jae Lee, Sejong-Si (KR); Cheon Tae Park, Daejeon (KR); Keung Koo Kim, Daejeon (KR); Soo Jai Shin, Daejeon (KR); Seung Yeop Yoo, Daejeon (KR); Young Min Bae, Daejeon (KR); Joo Hyung Moon, Daejeon (KR); Ju Hyeon Yoon, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 368 days.

(21) Appl. No.: 14/162,677

(22) Filed: Jan. 23, 2014

(65) Prior Publication Data

US 2014/0219409 A1 Aug. 7, 2014

(30) Foreign Application Priority Data

Feb. 1, 2013 (KR) .................. 10-2013-0011994

(51) Int. Cl.
*G21C 15/18* (2006.01)

(52) U.S. Cl.
CPC .............. *G21C 15/18* (2013.01); *Y02E 30/40* (2013.01)

(58) Field of Classification Search
CPC .................................. G21C 15/18; G21C 3/06
(Continued)

(56) References Cited

U.S. PATENT DOCUMENTS

| 5,180,543 A * | 1/1993 | Conway ................. G21C 15/18 |
| | | 376/282 |
| 2009/0232267 A1 | 9/2009 | Kwon et al. |

FOREIGN PATENT DOCUMENTS

| CN | 101847451 | 9/2010 |
| CN | 201681637 | 12/2010 |

(Continued)

OTHER PUBLICATIONS

Office Action issued in Korean patent application No. 10-2013-0011994, dated Mar. 11, 2014, 6 pages.

(Continued)

*Primary Examiner* — Jack W Keith
*Assistant Examiner* — Lily C Garner
(74) *Attorney, Agent, or Firm* — Morrison & Foerster LLP

(57) ABSTRACT

The present disclosure may disclose a multi stage safety injection device, including a safety injection tank formed to contain coolant to be injected into a reactor vessel by a gravitational head of water when an accident occurs in which the pressure or water level of the reactor vessel is decreased, a pressure balance line connected to the reactor vessel and safety injection tank to form a pressure balance between the reactor vessel and the safety injection tank, and a set of safety injection lines connected to the safety injection tank and the reactor vessel to inject coolant to the reactor vessel in a pressure balance state between the reactor vessel and the safety injection tank, and connected to the safety injection tank with different heights to reduce a flow rate of coolant injected into the reactor vessel step by step according to the water level reduction of the safety injection tank in order to inject coolant to the reactor vessel at multi stages.

7 Claims, 16 Drawing Sheets

(58) Field of Classification Search
USPC .................. 376/282, 283, 298–99, 293, 245
See application file for complete search history.

(56) References Cited

FOREIGN PATENT DOCUMENTS

| CN | 201681637 U | * | 12/2010 | ............. G21C 15/18 |
|----|-------------|---|---------|--------------------------|
| CN | 201788707   |   | 4/2011  |                          |
| JP | 55119267 A  | * | 9/1980  |                          |
| JP | 2977234     |   | 2/1991  |                          |
| KR | 20050119247 |   | 12/2005 |                          |
| KR | 100934024   |   | 9/2009  |                          |

OTHER PUBLICATIONS

Notice of the First Office Action (translation) for CN 201410043657.6, dated Dec. 21, 2015, 5 pages.

* cited by examiner

MULTI STAGE SAFETY INJECTION DEVICE AND PASSIVE SAFETY INJECTION SYSTEM HAVING THE SAME

CROSS-REFERENCE TO RELATED APPLICATION

Pursuant to 35 U.S.C. §119(a), this application claims the benefit of earlier filing date and right of priority to Korean Application No. 10-2013-0011994, filed on Feb. 1, 2013, the contents of which is incorporated by reference herein in its entirety.

BACKGROUND OF THE DISCLOSURE

1. Field of the Disclosure

The present disclosure relates to a multi stage safety injection device capable of injecting coolant into a reactor vessel step by step when a reactor accident occurs, and a passive safety injection system having the same.

2. Description of the Related Art

A Reactor can be classified according to the configuration of a safety system or the installation location of a main component. According to the characteristics of a safety system, a reactor can be classified into i) an active reactor using an active force such as a pump or the like, and ii) a passive reactor using a passive force such as gravity force, pressure force or the like. And also according to the installation location of main components (a steam generator, a pressurizer, and a pump impeller), a reactor can be divided into i) a loop type reactor in which main components are installed out of the reactor vessel, and ii) an integral reactor in which main components are installed within the reactor vessel.

When an accident occurs in a reactor, passive tanks with various types are used to supply emergency cooling water to a reactor vessel. i) A nitrogen pressurized safety injection tank (accumulator) for rapidly supplying coolant to a reactor during a large break loss of coolant accident, in which a large line is fractured to outflow a large amount of coolant, is used in domestic and abroad commercial loop type water reactors, and ii) a core makeup tank using a gravitational head of water subsequent to making a pressure balance between the reactor and tank is used in addition to a nitrogen pressurized safety injection tank in the U.S. Westinghouse passive loop type reactors such as AP600, AP1000 and so on.

In the integral reactor, main components such as pumps and steam generators or the like are installed within the reactor vessel contrary to the commercial loop type water reactor, and thus there are no large lines for connecting the main components. Accordingly, in the lines which connecting a reactor vessel and systems such as a chemical and volume control system, a safety injection system, a shutdown cooling system, a safety valve, and the like, have small size in integral reactor. Due to these characteristics, a large break loss of coolant accident, where large lines are fractured, is eliminated fundamentally.

Furthermore, in the integral reactor, main components are installed into a reactor vessel, where a large amount of coolant exists. Accordingly, when an accident, a loss of coolant accident due to a break such as a line fracture or the like, occurs in the integral reactor, the pressure and water level within the reactor vessel are slowly decreased compared to those of a loop type reactor. Even the integral reactor has such characteristics, in general, the integral reactor requires i) a high flow rate of coolant safety injection at the initial stage of the accident in which the core level is relatively fast decreased, ii) a medium flow rate of coolant safety injection at the early and middle stages of the accident in which the coolant discharge flow rate is relatively large due to a high internal pressure of the reactor vessel, and iii) a low flow rate of coolant safety injection at the middle and late stages of the accident in which the coolant discharge flow rate is greatly reduced due to a decreased pressure of the reactor vessel. It is noted that a high flow rate of the integral reactor is quite smaller compared to a flow rate required in the commercial loop type reactor.

However, a nitrogen pressurized safety injection tank in the related art has been typically designed to quickly inject a high flow rate of coolant in a safe manner when the internal pressure of the reactor vessel is rapidly decreased, and a core makeup tank in the related art has been designed to safely inject at a single mode flow rate along a predetermined passage due to a gravitational head of water subsequent to making a pressure balance between the reactor vessel and core makeup tank. As a result, in order to compensate such a disadvantage in the related art, various type systems are used in a complicated manner in a reactor according to the required characteristic of safety injection during an accident.

For instance, i) a pressure balance core makeup tank (safety injection at high pressure), a pressurized safety injection tank (safety injection at medium pressure), an in-containment refuelling water storage tank (safety injection at low pressure), and the like are used in a complicated manner in a passive safety system such as passive pressurized water reactors AP600, AP1000 and the like, and ii) a pressurized safety injection tank (safety injection at medium pressure), a high-pressure safety injection pump, a low-pressure safety injection pump, and the like are used in a complicated manner in an active safety system.

Accordingly, a device for simplifying safety injection facilities that have been configured in a complicated manner according to the required characteristic of safety injection into the reactor to effectively inject coolant will be taken in to consideration.

SUMMARY OF THE DISCLOSURE

An aspect of the present disclosure is to simplify a safety injection facility that has been configured in a complicated manner.

Another aspect of the present disclosure is to provide a safety injection facility in which a flow rate of coolant injection is varied according to the required characteristic of safety injection into the reactor when an accident occurs.

In order to accomplish the foregoing aspects, a multi stage safety injection device according to an embodiment of the present disclosure may include a safety injection tank formed to contain coolant to be injected into a reactor vessel by a gravitational head of water when an accident occurs in which the pressure or water level of the reactor vessel is decreased, a pressure balance line connected to the reactor vessel and safety injection tank to form a pressure balance state between the reactor vessel and the safety injection tank, and a set of safety injection lines connected to the safety injection tank and the reactor vessel to inject coolant to the reactor vessel in a pressure balance state between the reactor vessel and the safety injection tank, and connected to the safety injection tank with different heights to reduce a flow rate of coolant injected into the reactor vessel step by step according to the water level reduction of the safety injection tank.

According to an example associated with the present disclosure, the safety injection line may form a total flow resistance being increased step by step according to the water level reduction of the safety injection tank to decrease a flow rate of coolant injected into the reactor vessel. It is based on a principle in which a flow resistance of total summed passages decreases in case of safety injection with two summed passages than that with only one passage, and further decreases in case of three summed passages than that with two summed passages.

According to another example associated with the present disclosure, the safety injection line may include a first safety injection line connected to a lower end part of the safety injection tank to continuously provide an injection passage for coolant filled within the safety injection tank is injected into the reactor vessel, and at least one second safety injection line connected to the safety injection tank at a location higher by a predetermined height from the first safety injection line to provide an injection passage for coolant until the water level of the safety injection tank becomes lower than a predetermined water level.

According to another example associated with the present disclosure, the multi stage safety injection device may further include a plurality of orifices, at least one of which is installed for each of the safety injection line to act as a flow resistance of coolant injection, and configured to increase a total flow resistance step by step according to the water level reduction of the safety injection tank. It is intended to give a suitable flow resistance for each of the safety injection lines, thereby performing suitable coolant injection step by step according to the required characteristic of the reactor when an accident occurs.

According to another example associated with the present disclosure, the multi stage safety injection device may further include an isolation valve installed at the pressure balance line to block the flowing of coolant from the reactor vessel into the safety injection tank during a normal plant operation, and assigned to be open by a control signal generated from the pressure or water level reduction of the reactor vessel to implement coolant injection in a pressure balance state between the reactor vessel and the safety injection tank by a gravitational head of water when an accident occurs.

According to another example associated with the present disclosure, the multi stage safety injection device may further include an isolation valve installed at the safety injection line to block the flowing of coolant from the safety injection tank to the reactor vessel in a pressure balanced state with the reactor vessel during a normal plant operation, and assigned to be open by a control signal generated from the pressure or water level reduction of the reactor vessel to implement coolant injection from the safety injection tank to the reactor vessel when an accident occurs.

Furthermore, in order to implement the forgoing task, according to the present disclosure, there is disclosed a passive safety injection system. The passive safety injection system may include a core makeup tank connected to a reactor vessel to maintain a pressure balance state with the reactor vessel and inject coolant to the reactor vessel when an accident occurs in which the pressure or water level of the reactor vessel is decreased, and a multi stage safety injection device connected to the reactor vessel to inject coolant step by step to the reactor vessel at a pressure lower than that of the core makeup tank following to the injection of the core makeup tank, wherein the multi stage safety injection device includes a safety injection tank formed to contain coolant to be injected into a reactor vessel by a gravitational head of water when an accident occurs in which the pressure or water level of the reactor vessel is decreased, a pressure balance line connected to the reactor vessel and the safety injection tank to form a pressure balance between the reactor vessel and the safety injection tank, and connected to the reactor vessel and the core makeup to form a pressure balance state between the reactor vessel and the core makeup tank, and a set of safety injection lines connected to the safety injection tank and the reactor vessel to inject coolant to the reactor vessel in a pressure balance state between the reactor vessel and the safety injection tank, and connected to the safety injection tank with different heights to reduce a flow rate of coolant injected into the reactor vessel step by step according to the water level reduction of the safety injection tank.

According to an example associated with the present disclosure, the passive safety injection system may further include an isolation valve installed at the pressure balance line to block the flowing of coolant from the reactor vessel into the safety injection tank during a normal plant operation, and assigned to be open by a control signal generated from the pressure or water level reduction of the reactor vessel to implement coolant injection in a pressure balance state between the reactor vessel and the safety injection tank by a gravitational head of water when an accident occurs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
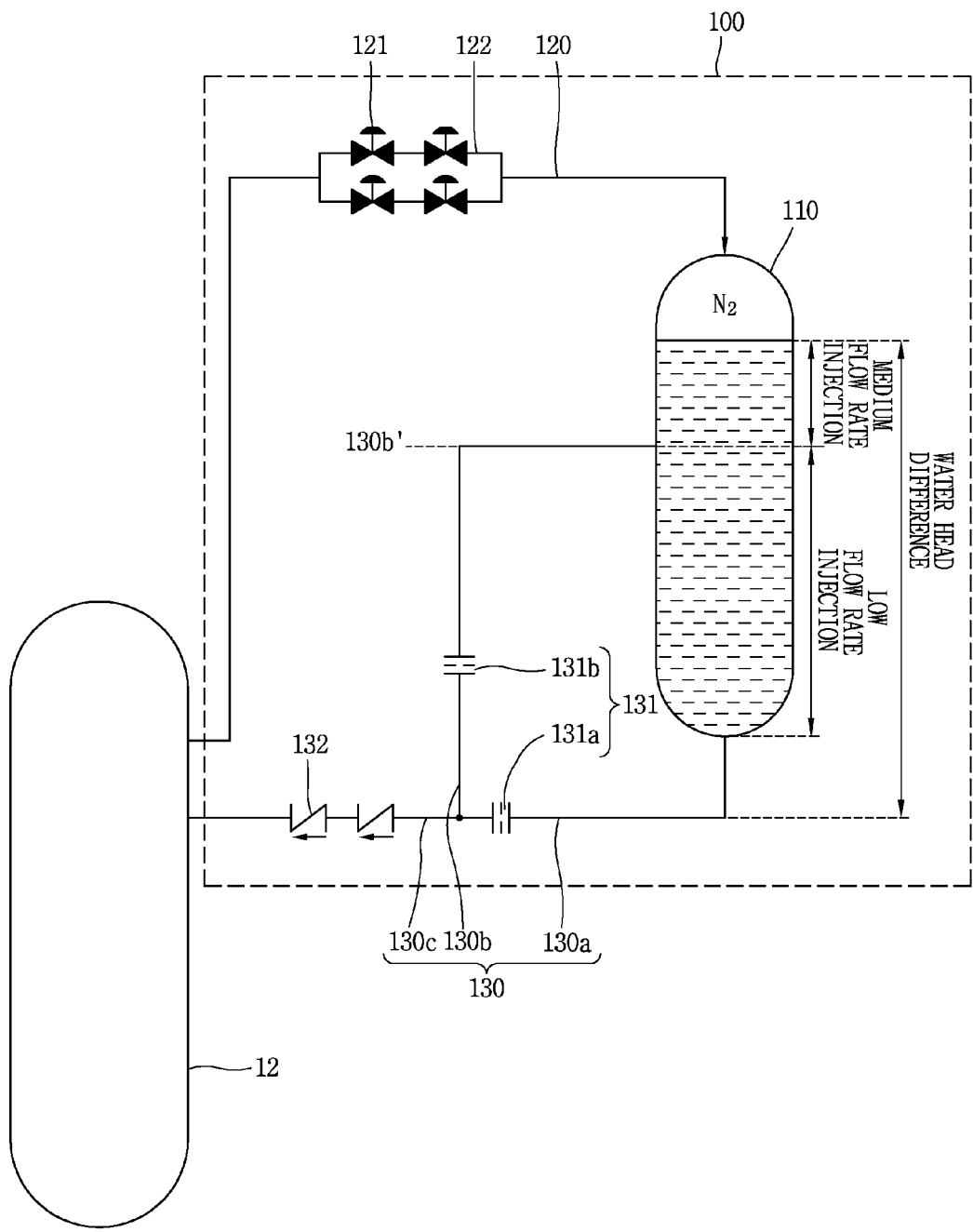
FIG. 1 is a conceptual view illustrating a multi stage safety injection device associated with an embodiment of the present disclosure.

Hereinafter, a multi stage safety injection device associated with the present disclosure and a passive safety injection system having the same will be described in more detail with reference to the accompanying drawings. Even in different embodiments according to the present disclosure, the same or similar reference numerals are designated to the same or similar configurations, and the description thereof will be substituted by the earlier description. Unless clearly mentioned otherwise, expressions in the singular number used in the present disclosure may include a plural meaning.

FIGS. 1 through 7 are views illustrating a multi stage safety injection device associated with an embodiment of the present disclosure, and FIGS. 8 through 15 are views illustrating a multi stage safety injection device associated with another embodiment of the present disclosure.

FIG. 1 is a conceptual view illustrating a multi stage safety injection device 100 associated with an embodiment of the present disclosure.

The multi stage safety injection device 100 is connected to a reactor vessel 12, and formed to inject coolant to the reactor vessel 12 using a passive force when a loss of coolant accident occurs due to a break such as a line fracture. However, the injection flow rate of coolant required according to the passage of time subsequent to an accident may not be constant, and thus the multi stage safety injection device 100 is designed to convert the flow rate of coolant being injected according to the passage of time.

The multi stage safety injection device 100 may include a safety injection tank 110, a pressure balance line 120 and a set of safety injection lines 130.

The safety injection tank 110 is formed to accommodate coolant therein. Coolant stored within the safety injection tank 110 is injected from the safety injection tank 110 to the reactor vessel 12 due to a gravitational head of water when a loss of coolant accident occurs in which the pressure or water level of the reactor vessel 12 is decreased. Gravitational head of water, as a water head determined by a location in the gravitational field, is energy formed by the safety injection tank 110 disposed at a higher location than that of the reactor vessel 12. Accordingly, coolant injection from the safety injection tank 110 to the reactor vessel 12 is carried out due to a gravitational head of water which is a passive force, and thus additional energy is not needed to be supplied from the outside. A space excluding coolant within the safety injection tank 110 is filled with a gas (typically, nitrogen is used).

The pressure balance line (reactor pressure balance pipe) 120 is connected to the reactor vessel 12 and safety injection tank 110 to form a pressure balance between the reactor vessel 12 and safety injection tank 110. When the pressure balance line 120 is open, fluid such as steam or water moves from the reactor vessel 12 having a relatively high pressure to the safety injection tank 110, and thus the reactor vessel 12 and safety injection tank 110 makes a pressure balance to each other. Coolant injection from the safety injection tank 110 to the reactor vessel 12 is carried out due to a gravitational head of water, and thus a pressure balance between the safety injection tank 110 and reactor vessel 12 should be first formed to inject coolant. An orifice (not shown) may be installed in the pressure balance line 120 to adjust a flow rate of fluid being introduced from the reactor vessel 12 into the safety injection tank 110.

An isolation valve 121 may be provided in the pressure balance line 120. The isolation valve 121 provided in the pressure balance line 120 is in a closed state during a normal plant operation to block fluid from being introduced from the reactor vessel 12 into the safety injection tank 110. Accordingly, during a normal plant operation, the reactor vessel 12 and safety injection tank 110 maintains an isolated state due to the isolation valve 121, and thus the pressure thereof is not in a balanced state.

The isolation valve 121 is open by a control signal of the relevant system generated from the pressure or water level reduction of the reactor vessel when a reactor accident occurs. When fluid is introduced from the reactor vessel 12 into the safety injection tank 110 to form a pressure balance between the reactor vessel 12 and the safety injection tank 110, coolant injection due to a gravitational head of water is started from the safety injection tank 110.

When a single isolation valve 121 is installed therein, the entire multi stage safety injection device 100 may not be operated due to a failure of the isolation valve 121, and therefore, a plurality of isolation valves 121 may be installed in a plurality of branch lines 122 operating independently from each other, respectively, as illustrated in the drawing. Furthermore, the isolation valve 121 installed in the pressure balance line 120 may be open by a control signal generated from the pressure or water level reduction of the reactor vessel 12, and thus designed to receive power backup using a battery or the like to be prepared for power loss (AC).

When the isolation valve 121 is installed in the pressure balance line 120, a pressure between the reactor vessel 12 and the safety injection tank 110 is not balanced unless the isolation valve 121 is open and the pressure of the reactor vessel 12 is higher than that of the safety injection tank 110 to close the check valve 132, and thus coolant is not injected into the reactor vessel 12 from the safety injection tank 110 even when an additional isolation valve (not shown) is not installed in the safety injection line.

The safety injection line 130 is connected to the safety injection tank 110 and reactor vessel 12 to inject coolant within the safety injection tank 110 into the reactor vessel 12. When a pressure between the reactor vessel 12 and the safety injection tank 110 is balanced due to the pressure balance line 120, coolant filled within the safety injection tank 110 is injected into the reactor vessel 12 through the safety injection line 130.

According to the present disclosure, a set of safety injection lines 130 are connected to the safety injection tank 110 with different heights to decrease a flow rate of coolant injected into the reactor vessel 12 according to the water level reduction of the safety injection tank 110. A first safety injection line 130a is connected to a lower end part of the safety injection tank 110 to provide an injection passage until almost of the coolant within the safety injection tank 110 is injected into the reactor vessel 12. A second safety injection line 130b is connected to the safety injection tank 110 at a location higher by a predetermined height from the first safety injection line 130a to provide an injection passage for coolant until the water level of the safety injection tank becomes less than a predetermined water level. A height difference between first safety injection line 130a and second safety injection line 130b connected to the safety injection tank may be varied according to the required characteristic of coolant safety injection into the reactor.

When the injection of coolant into reactor vessel 12 from the safety injection tank 110 is started, the injection of coolant is carried out through the first safety injection line 130a and second safety injection line 130b at first, but the injection of coolant through the second safety injection line 130b is no more carried out when the water level of coolant becomes less than the connected location between the second safety injection line 130b and the safety injection tank 110 (the installation height of the second safety injection line 130b denotes a location 130b' at which the second safety injection line 130b is connected to the safety injection tank 110 unless otherwise clearly different in its context in the present disclosure). Accordingly, the entire flow rate of coolant injected into the reactor vessel 12 decreases as much as the flow rate of coolant that has been injected through the second safety injection line 130b.

Even when coolant is injected through the first safety injection line 130a and second safety injection line 130b, a water head difference decreases as decreasing the water level within the safety injection tank 110, and thus the flow rate of coolant injection decreases to a certain extent. Similarly, even when the safety injection of coolant is carried out only by the first safety injection line 130a, a flow rate of coolant injection gradually decreases according to the water level reduction of the safety injection tank 110. However, the decrease speed of an injection flow rate in case where coolant is injected only through the first safety injection line 130a is slower than that in case where coolant is injected through the first safety injection line 130a and second safety injection line 130b. It is because the injection flow rate of coolant itself in the former case is less than that in the latter case.

At a moment when the injection of coolant is no more carried out through the second safety injection line 130b due to the water level reduction of the safety injection tank 110, the flow rate of coolant being injected into the reactor vessel 12 suddenly decreases at a fast rate. It is because one injection passage of coolant is removed in addition to a simple reduction of its water head difference.

The first safety injection line 130a and second safety injection line 130b may be merged at any one position prior to being injected into the reactor vessel 12 as illustrated in the drawing. A check valve 132 may be installed in a safety injection line 130c into which the first safety injection line 130a and second safety injection line 130b are merged. The check valve 132 is a device for blocking coolant from flowing backward from the reactor vessel 12 to the safety injection tank 110. The check valve 132 is open by a gravitational head of water when coolant is injected from the safety injection tank 110 to the reactor vessel 12 due to the occurrence of a reactor accident.

The design pressure of the safety injection tank 110 is determined by a pressure making a balance to the reactor vessel 12. When the isolation valve 121 is installed in the pressure balance line 120 and the check valve 132 is installed in the safety injection line 130c, a pressure between the reactor vessel 12 and the safety injection tank 110 does not form a balance prior to the isolation valve 121 being open during an accident, and thus the design pressure of the safety injection tank 110 may be designed to be lower than that of the reactor vessel 12.

An orifice 131 is installed in the safety injection line 130 to act as a flow resistance of coolant. For the multi stage safety injection device 100, at least one orifice 131 may be installed for each of the safety injection lines 130 to adjust an injection flow rate of coolant step by step.

The orifice 131 forms a suitable flow resistance for each of the safety injection lines 130 to perform suitable coolant injection step by step according to the required characteristic of the reactor. A flow resistance of total summed passages decreases in case of safety injection with two or three summed passages than that with only one passage. Here, the degree of decreasing a flow resistance of total passages may be set according to the flow resistance of the orifice 131.

As illustrated in the drawing, when the second safety injection line 130b is connected to the safety injection tank 110 at a higher location than that of the first safety injection line 130a, a relatively small total flow resistance is formed by a second orifice 131b installed in the second safety injection line 130b than that of a first orifice 131a installed in the first safety injection line 130a, thereby allowing a relatively higher flow rate of coolant to flow through the safety injection line 130.

A flow rate of coolant in case where the safety injection is carried out only through the first safety injection line 130a is less than that in case where safety injection is carried out through the first safety injection line 130a and second safety injection line 130b at the same time. Because an additional flow rate is generated by the second injection line 130b, when the injection of coolant is carried out through the combined paths of the first safety injection line 130a and the second injection line 130b. The reason of setting the injection flow rate of coolant as described above is to expand an injection time in case of performing a relatively low flow rate of safety injection, thereby performing safety injection for a long period of time (more than about 72 hours in case of a passive safety injection system).

The safety injection lines 130a, 130b are connected to the safety injection tank 110 with different heights from each other, and thus coolant is no more introduced from the second safety injection line 130b when the water level within the safety injection tank 110 is reduced below than the location of 130b'. Accordingly, for the multi stage safety injection device 100, safety injection from the safety injection tank 110 to the reactor vessel 12 may be carried out with multiple stages, and a size of the safety injection tank 110, a height of the safety injection line, and a flow resistance of the orifice are set according to the characteristics of safety injection required by a reactor, thereby injecting coolant in a continuous and successive manner for a long period of time required by the reactor.

Safety injection facilities in the related art that have been configured in a complicated manner has a problem such as a delay or overlap of time for making a pressure balance for each safety injection tank during the process of performing the switching of safety injection flow rates, but according to a multi stage safety injection device 100 presented in the present disclosure, the flow rate switching of coolant is successively carried out in a state that a pressure balance is made between the safety injection tank 110 and the reactor vessel 12, thus not causing a problem such as a delay or overlap of time during the flow rate switching subsequent to starting the operation of the safety injection tank 110. Furthermore, the multi stage safety injection device 100 is a passive safety injection system, thereby enhancing the reliability and stability compared to an active safety injection system.

Hereinafter, the operation of a multi stage safety injection device installed in an integral reactor and other system arrangements during a normal plant operation or the occurrence of an accident will be described.

Figure 2:
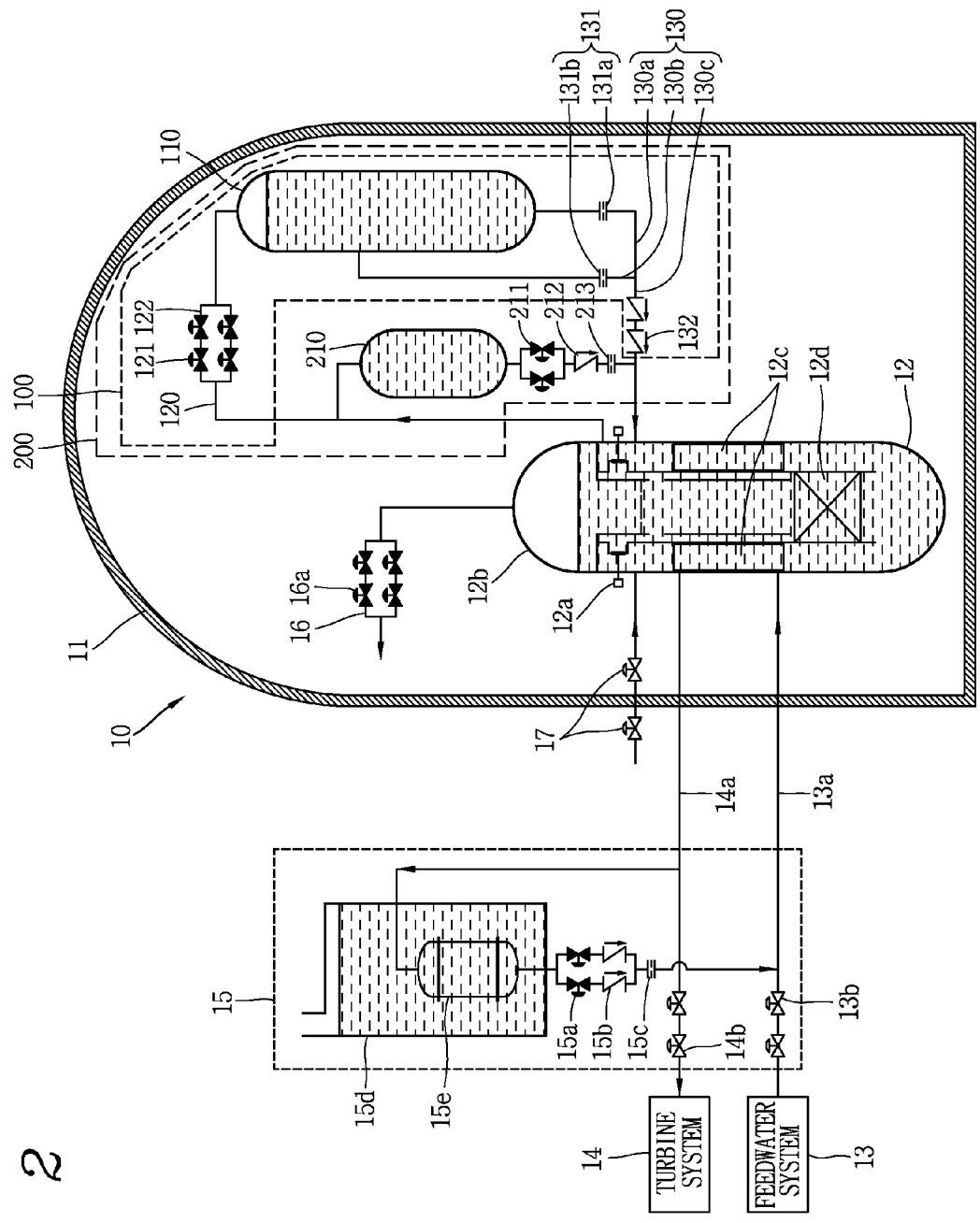
FIG. 2 is a conceptual view illustrating the normal plant operation state of an integral reactor installed with a multi stage safety injection device illustrated in FIG. 1.

FIG. 2 is a conceptual view illustrating the normal plant operation state of an integral reactor 10 installed with a multi stage safety injection device 100 illustrated in FIG. 1.

For the integral reactor 10, the reactor vessel 12 is disposed within a containment building (container) 11. For the integral reactor 10, main components such as reactor coolant pumps 12a, a pressurizer 12b, steam generators 12c, and the like are installed within the reactor vessel 12 as described above.

Water is supplied to the steam generator 12c through a feedwater line 13a from the feedwater system 13 located out of the containment building 11, and water receives energy from nuclear fission produced in the core 12d to become high temperature and high pressure steam, and moves to a turbine system 14 located out of the containment building 11 through a steam line 14a. During a normal plant operation, isolation valves 13b, 14b installed in the feedwater line 13a and steam line 14a are in an open state.

A passive residual heat removal system 15 is installed out of the containment building 11, and connected to the steam line 14a and feedwater line 13a to remove heat from the reactor vessel 12 when an accident occurs. However, during a normal plant operation of the integral reactor 10, an isolation valve 15a is maintained in a closed state.

An automatic depressurization system 16 is installed within the containment building 11, and connected to the reactor vessel 12 to reduce a pressure of the reactor vessel 12 when an accident occurs. However, in the automatic depressurization system 16, the automatic depressurization valves 16a are also maintained in a closed state during a normal plant operation of the integral reactor 10 similarly to the passive residual heat removal system 15.

A passive safety injection system 200 is installed within the containment building 11, and connected to the reactor vessel 12 to inject coolant into reactor vessel 12. The passive safety injection system 200 is generally composed of multi trains. The passive safety injection system 200 may include the multi stage safety injection device 100 and core makeup tank 210, and both isolation valves 121, 211 are maintained in a closed state during a normal plant operation of the integral reactor 10.

During a normal plant operation of the integral reactor 10, a containment building isolation valve 17 is in an open state, and the passive safety injection system 200, passive residual heat removal system 15 and automatic depressurization system 16 do not operate.

Figure 3:
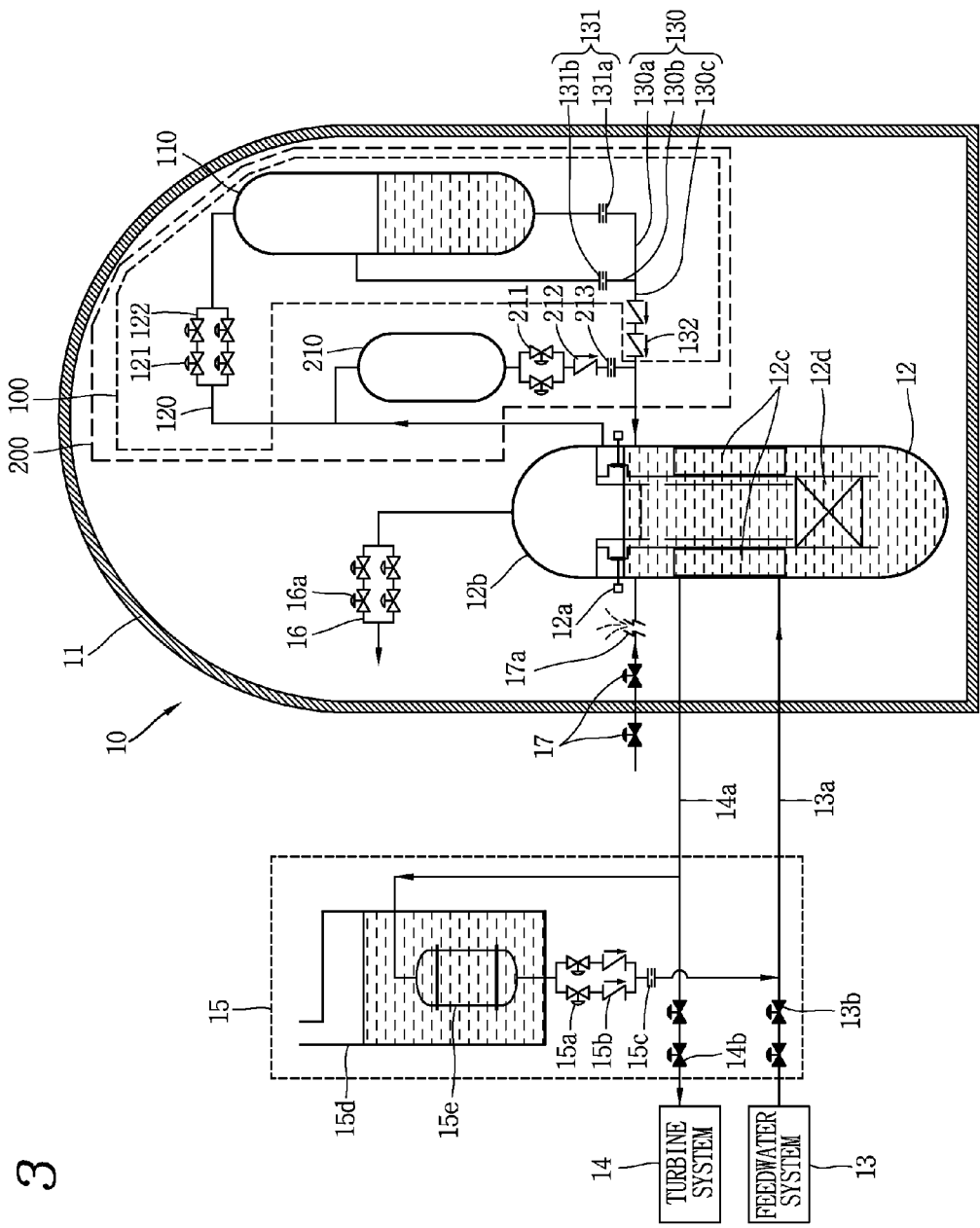
FIG. 3 is a conceptual view illustrating the operation of a safety facility when a loss of coolant accident occurs in the integral reactor illustrated in FIG. 2.

FIG. 3 is a conceptual view illustrating the operation of a safety facility when a loss of coolant accident occurs in the integral reactor 10 illustrated in FIG. 2.

When a loss of coolant accident such as line fracture or the like occurs in which coolant is discharged and thus the pressure or water level of the reactor vessel 12 is decreased, the containment building isolation valve 17 is closed, and the isolation valve 13b installed in the feedwater line 13a and the isolation valve 14b installed in the steam line 14a are also closed by a control signal of the relevant system to stop the operation of the feedwater system 13 and turbine system 14.

The isolation valve 15a of the passive residual heat removal system 15 is open by the relevant control signal. Coolant within the condensation heat exchanger 15e (contained within emergency cooling tank 15d) is introduced into the feedwater line 13a through the check valve 15b and orifice 15c to transfer residual heat from the reactor vessel 12, and returned to the steam line 14a to remove residual heat using the condensation heat exchanger 15e.

Similarly, the valves 16a of the automatic depressurization system 16 are open by the relevant control signal to reduce a pressure of the reactor vessel 12, thereby smoothly performing safety injection from the passive safety injection system 200.

The core makeup tank 210 is connected to the reactor vessel 12 by the pressure balance line 120 to maintain a pressure balance state with the reactor vessel 12, and connected to the reactor vessel 12 by the safety injection line 130c to inject coolant to the reactor vessel 12 when an accident occurs. Accordingly, the core makeup tank 210 is connected to the reactor vessel 12 by the pressure balance line 120 and safety injection line 130c, but the function of each line is totally different. A portion for connecting the reactor vessel 12 and core makeup tank 210 from the pressure balance line 120 is open all the time, and thus the reactor vessel 12 and core makeup tank 210 maintain a pressure balance state. Accordingly, the design pressure of the core makeup tank 210 is high at a level of the reactor vessel 12.

The isolation valve 211 installed between the core makeup tank 210 and safety injection line 130c is open by a control signal generated from the pressure or water level reduction of the reactor vessel 12, and pressure balance type safety injection due to the water level of the core makeup tank 210 is started into the reactor vessel 12. Coolant is passed through the isolation valve 211, check valve 212 and orifice 213 and injected into the reactor vessel 12, and the flow rate at this time is suitably established by the orifice 213. Safety injection due to the core makeup tank 210 is carried out at a relatively high flow rate compared to that of the multi stage safety injection device 100 which will be described later.

When the pressure or water level of the reactor vessel 12 is further reduced due to cooling of the reactor vessel 12, discharging from the fractured portion and the like, a control signal is generated from the relevant system to open the isolation valve 121 installed in the pressure balance line 120, thereby forming a pressure balance between the reactor vessel 12 and the safety injection tank 110. The isolation valve 121 installed in the pressure balance line 120 is designed to be open subsequent to the pressure or water level of the reactor vessel being reduced to a certain extent, and thus the design pressure of the safety injection tank 110 is designed to be lower than that of the core makeup tank 210, and the coolant injection into the reactor vessel 12 is also carried out at a pressure lower than that of the core makeup tank 210.

Referring to FIG. 1, the injection of coolant due to the multi stage safety injection device 100 may be divided into two stages. When coolant injection due to the core makeup tank 210 is set to as a high flow rate of safety injection, coolant injection due to the multi stage safety injection device 100 may be carried out with two stages at a pressure lower than that of the core makeup tank 210, and thus each stage can be divided into a medium flow rate of safety injection and a low flow rate of safety injection. The medium flow rate of safety injection is carried out through the first safety injection line 130a and second safety injection line 130b of the multi stage safety injection device 100 at a pressure condition lower than that of the high flow rate of safety injection of the core makeup tank 210, and the low flow rate of safety injection is carried out through the first safety injection line 130a from a time point at which the coolant level of the safety injection tank 110 is reduced than that of the installation location of the second safety injection line 130b.

A high flow rate of safety injection due to the core makeup tank 210 and a medium and low flow rate of safety injection due to the multi stage safety injection device 100 may denote relative flow rates, respectively, and each flow rate may be set according to the safety injection characteristics required by the reactor.

The reason of requiring multi stage safety injection from a high to a low flow rate is due to the accident characteristics of the reactor. In particular, for the integral reactor 10, the water level of the core relatively fast decreases when an accident occurs, and thus a high flow rate of coolant is required to be rapidly injected. The passive safety injection system 200 implements a high flow rate of safety injection by the core makeup tank 210.

Subsequent to the occurrence of an accident, the internal pressure of the reactor vessel is still high with a relatively high coolant discharge flow rate from the early to middle stages of the accident, but the pressure of the reactor decreases with a relatively low coolant discharge flow rate from the middle to late stages of the accident, and thus a medium and a low flow rate of safety injection are required, respectively. For the passive safety injection system 200, a medium and a low flow rate of safety injection are carried out step by step by the multi stage safety injection device 100.

Referring to FIG. 3, the inside of the core makeup tank 210 is vacant and thus a high flow rate of safety injection due to the core makeup tank 210 has been previously completed. The coolant level within the safety injection tank 110 is positioned below a location at which the second safety injection line 130b is connected to safety injection tank 110, and thus it is seen that a medium flow rate of safety injection has been completed, and a lower flow rate of safety injection is carried out only through the first safety injection line 130a.

Hereinafter, a medium and a low flow rate of safety injection processes by means of the multi stage safety injection device 100 will be described with reference to FIGS. 4 through 6.

Figure 4:
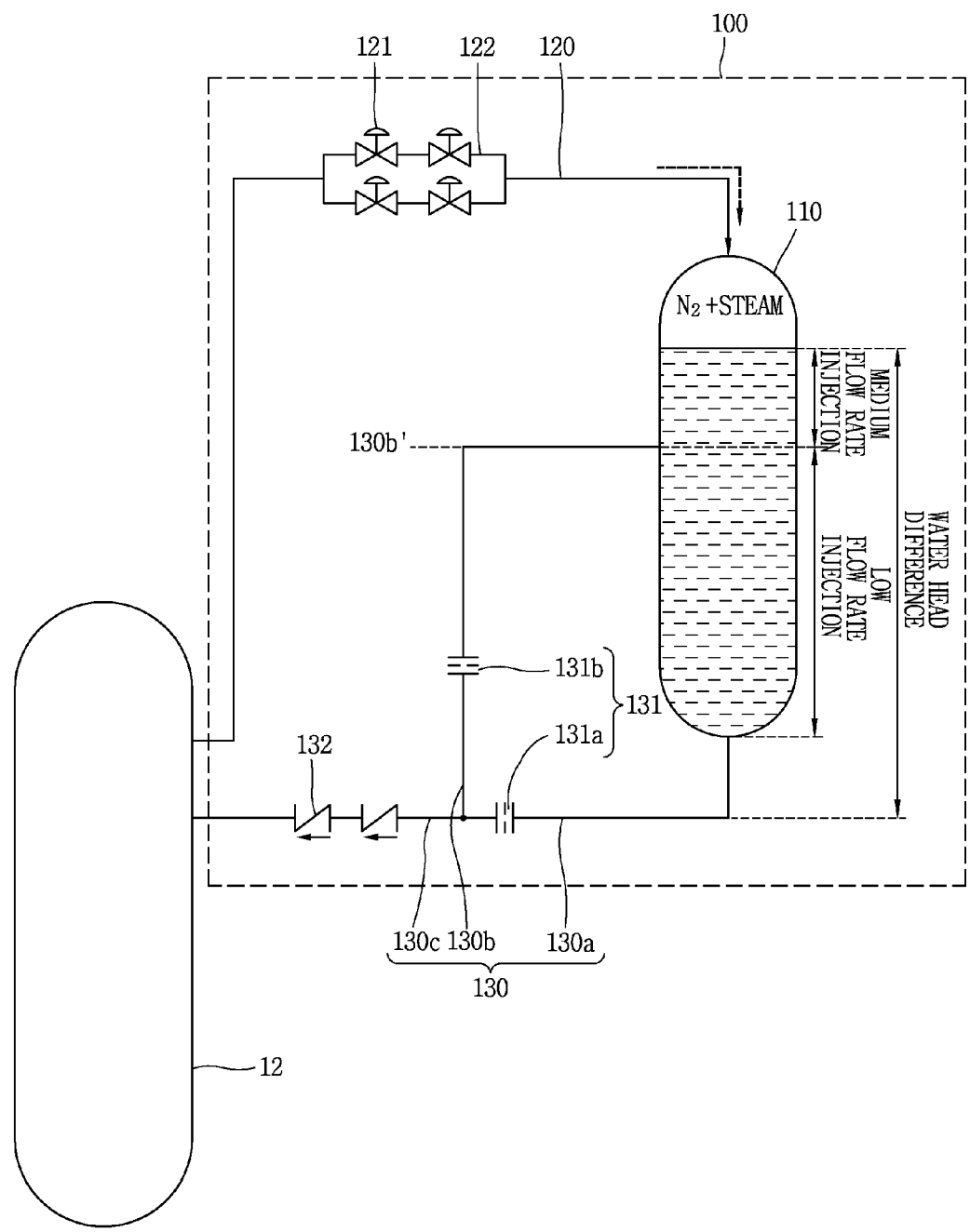
FIG. 4 is a conceptual view illustrating a pressure balance step when a loss of coolant accident occurs in the multi stage safety injection device illustrated in FIG. 1.

FIG. 4 is a conceptual view illustrating the pressure balance step when a loss of coolant accident occurs in the multi stage safety injection device 100 illustrated in FIG. 1.

When the isolation valve 121 installed in the pressure balance line 120 is open by a control signal, fluid is introduced from the reactor vessel 12 to the safety injection tank 110 through the pressure balance line 120. The multi stage safety injection device 100 is a safety facility using a pressure balance method between the reactor vessel 12 and the safety injection tank 110, and therefore, a pressure balance should be formed between the safety injection tank 110 and the reactor vessel 12 before to start coolant injection from the safety injection tank 110.

When fluid is introduced from the reactor vessel 12, an upper portion within the safety injection tank 110 is filled with nitrogen gas that has been filled therein in advance and the steam. A pressure between the reactor vessel 12 and safety injection tank 110 is gradually balanced according to the introduction of fluid, and the opening of the check valve 132 installed in the safety injection line 130 and safety injection is started by a gravitational head of water of the safety injection tank 110.

Figure 5:
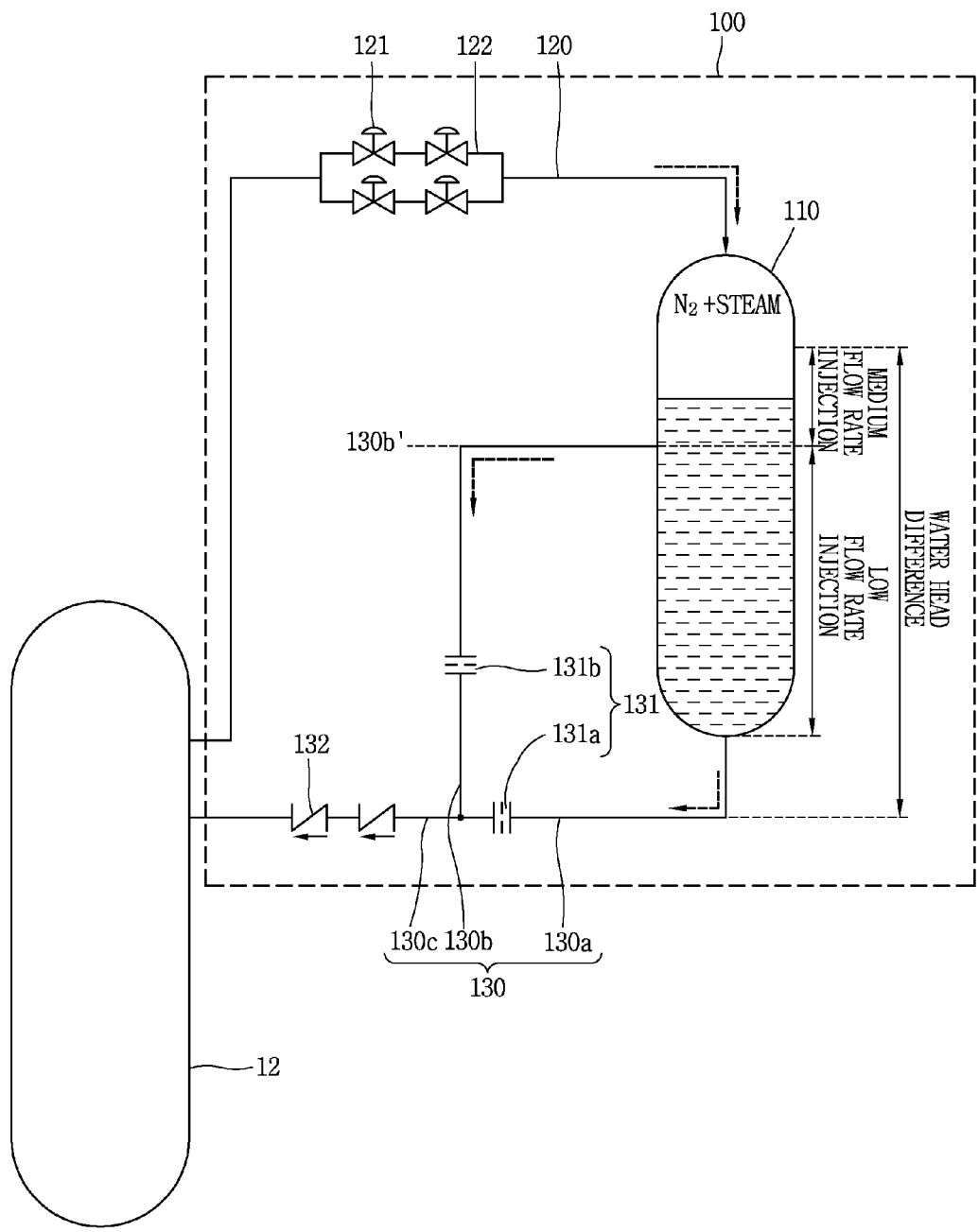
FIG. 5 is a conceptual view illustrating a coolant injection step (medium flow rate of injection step) in a multi stage safety injection device subsequent to FIG. 4.

FIG. 5 is a conceptual view illustrating a coolant injection step (medium flow rate of injection step) in the multi stage safety injection device 100 subsequent to FIG. 4.

When safety injection by means of the multi stage safety injection device 100 is started, a medium flow rate of safety injection is carried out through the first safety injection line 130a and second safety injection line 130b until the water level of the safety injection tank 110 is reduced than the installation height 130b' of the second safety injection line 130b.

The first orifice 131a installed in the first safety injection line 130a is configured to inject a predetermined flow rate of coolant according to the characteristics of the reactor required when coolant is injected in a single mode, and the second orifice 131b installed in the second safety injection line 130b is formed to inject a predetermined flow rate of coolant according to the characteristics of the reactor required when coolant is injected through both the first safety injection line 130a and second safety injection line 130b. Accordingly, the flow rate of coolant injected through both the first safety injection line 130a and second safety injection line 130b is higher than that only through the first safety injection line 130a.

A gravitational head of water is gradually decreased by the water level reduction of the safety injection tank 110 even while implementing a medium flow rate of safety injection by means of the first safety injection line 130a and second safety injection line 130b, and the flow rate of coolant injected into the reactor vessel 12 is gradually reduced. The flow rate of coolant injected into the reactor vessel 12 is only gradually decreased but not instantaneously and rapidly reduced until the water level of the safety injection tank 110 is reduced than the installation height 130b' of the second safety injection line 130b. However, when the water level of the safety injection tank 110 is reduced lower than the installation height 130b' of the second safety injection line 130b, the flow rate of coolant injected into the reactor vessel 12 is instantaneously and rapidly reduced.

Figure 6:
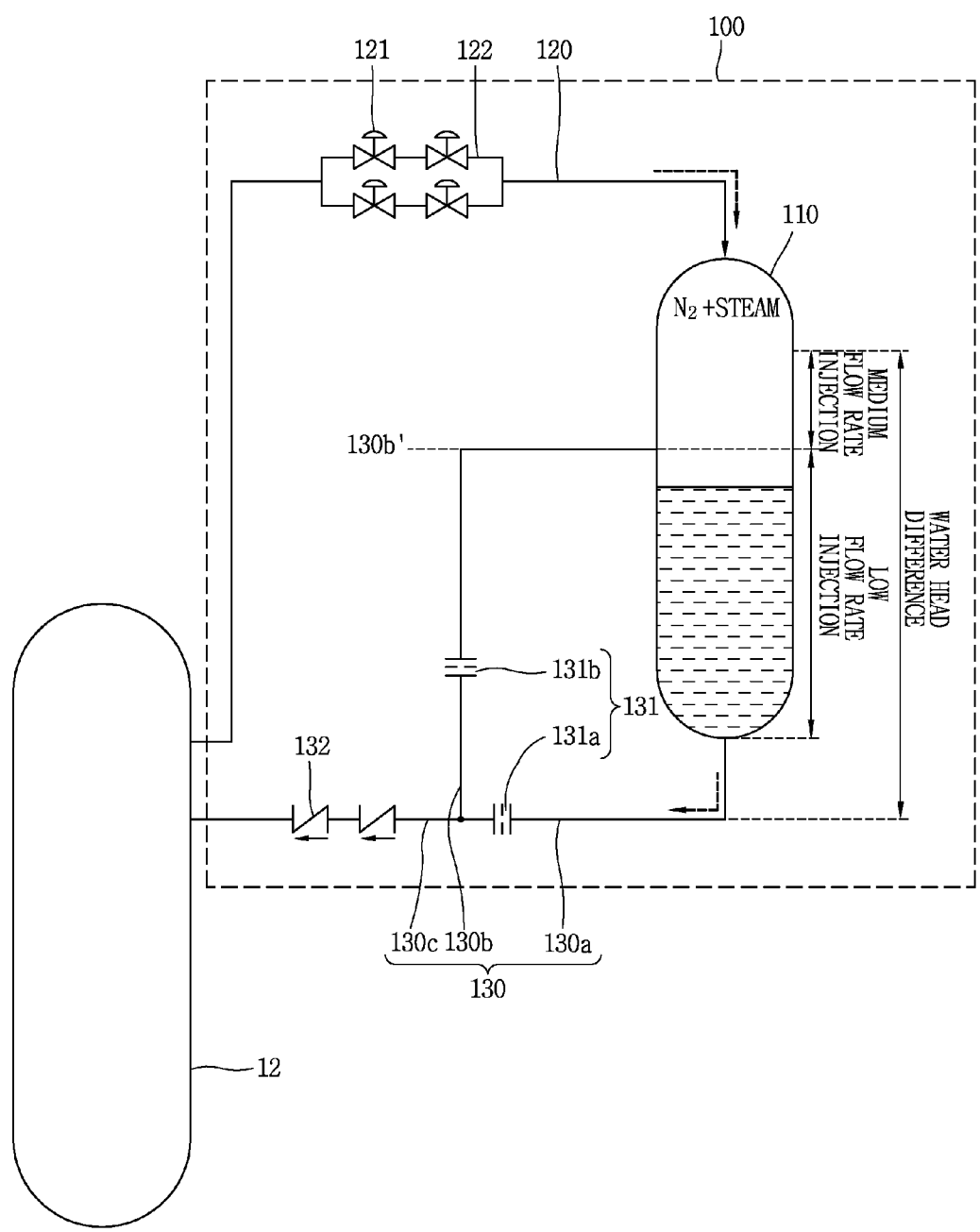
FIG. 6 is a conceptual view illustrating a coolant injection step (low flow rate of injection step) in a multi stage safety injection device subsequent to FIG. 5.

FIG. 6 is a conceptual view illustrating a coolant injection step (low flow rate of injection step) in the multi stage safety injection device 100 subsequent to FIG. 5.

Since the water level of the safety injection tank 110 is reduced lower than the installation height 130b' of the second safety injection line 130b, the injection of coolant is no more carried out through the second safety injection line 130b, but a low flow rate of safety injection is carried out only through the first safety injection line 130a.

A flow resistance is formed by the first orifice 131a installed in the first safety injection line 130a, and thus the amount of coolant injected into the reactor vessel 12 is adjusted to a low flow rate by the first orifice 131a. According to the progress of a low flow rate of safety injection, the water level of coolant in the safety injection tank 110 is gradually reduced, and a gravitational head of water thereof is gradually decreased but not instantaneously and rapidly reduced, as the amount of coolant injected through the first safety injection line 130a is relatively small, and thus the speed of decreasing a gravitational head of water and the speed of reducing an injection flow rate of coolant are very slow.

A low flow rate of safety injection may continue until almost of the coolant within the safety injection tank 110 is injected into the reactor vessel 12, and be maintained up to a time point (about 72 hours) that requires safety injection with no operator's action or emergency AC power in a passive reactor.

Hereinafter, a change of flow rate of coolant safety injection in time by means of the multi stage safety injection device 100 and core makeup tank 210 illustrated in FIGS. 1 through 6 will be described with reference to FIG. 7.

Figure 7:
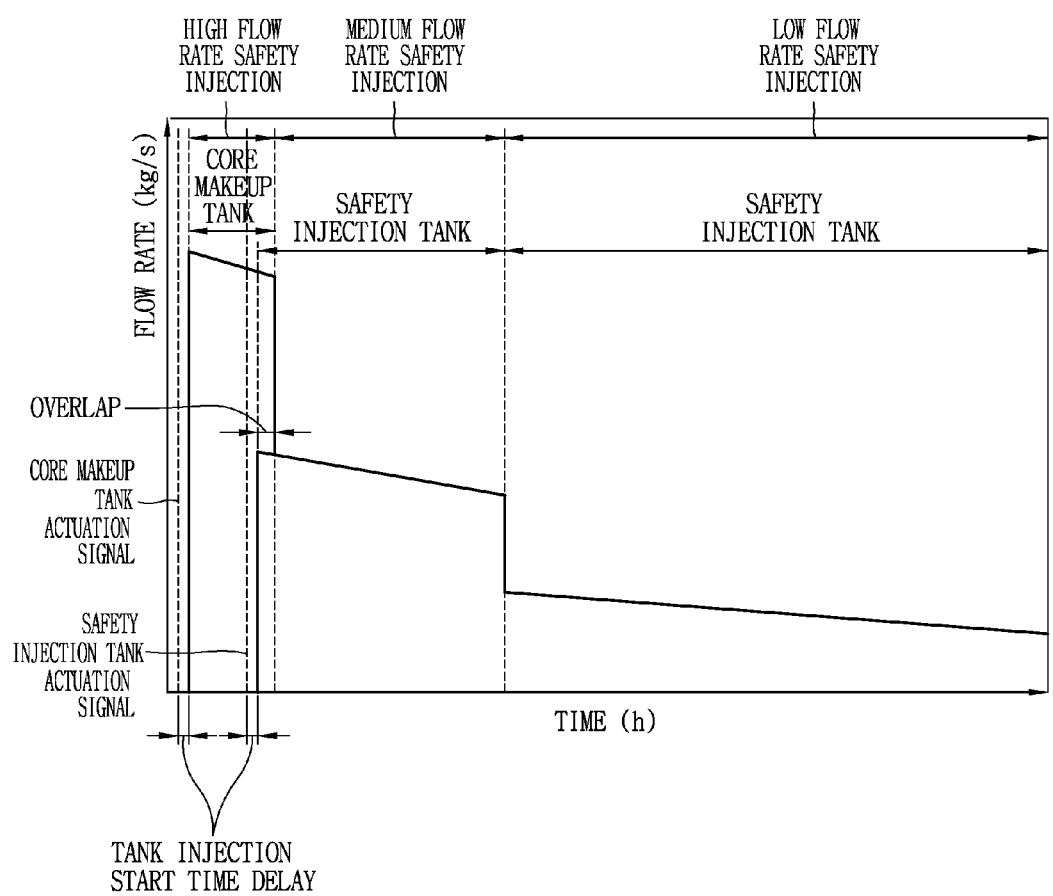
FIG. 7 is a graph illustrating an injection flow rate of coolant in time in a multi stage safety injection device and core makeup tank described in FIGS. 1 through 6.

FIG. 7 is a graph illustrating an injection flow rate of coolant in time in the multi stage safety injection device 100 and core makeup tank 210 described in FIGS. 1 through 6.

The horizontal axis denotes a flow of time from a moment at which a loss of coolant accident or the like occurs, and the vertical axis denotes a flow rate of coolant injection by means of the multi stage safety injection device and core makeup tank.

At the early stage of an accident, the water level of the core in a reactor vessel is relatively fast decreased, and thus a high flow rate of safety injection is carried out in the core makeup tank. The flow rate is gradually decreased due to a decrease of head of water of the core makeup tank even while implementing a high flow rate of safety injection.

A medium and a low flow rate of safety injection by means of the multi stage safety injection device are carried out subsequent to the early stage of an accident. The operation and injection time of the core makeup tank and multi stage safety injection device are varied according to the accident condition of a reactor, and thus a delay of safety injection start time using the multi stage safety injection device or a coolant injection overlap phenomenon of the core makeup tank and multi stage safety injection device during a pressure balance process subsequent to the operation of the multi stage safety injection device is an unavoidable physical phenomenon. However, when flow rate switching, that is the medium flow rate to the low flow rate, is carried out within the multi stage safety injection device, the overlap or delay of coolant injection does not occur as illustrated in the drawing.

When a medium flow rate of safety injection by means of the multi stage safety injection device is started, safety injection is reduced compared to a case of a high flow rate of safety injection. Furthermore, the flow rate of coolant injection is gradually decreased due to a decrease of head of water while implementing a medium flow rate of safety injection by means of the multi stage safety injection device.

When the water level of the safety injection tank is reduced than the installation height of the second safety injection line, a flow rate of coolant injection is instantaneously and rapidly decreased to implement a low flow rate of safety injection. The reduction of flow rate continues even while implementing a low flow rate of safety injection, but the reduction speed is very slow and continual safety injection is carried out to maintain it for a period of time required by the reactor.

As described above, a multi stage safety injection device according to the present disclosure may be formed to decrease a flow rate of coolant injection step by step according to the required safety injection characteristics of a reactor, thereby injecting coolant for a long period of time.

Hereinafter, a multi stage safety injection device associated with another embodiment of the present disclosure will be described with reference to FIGS. 8 through 16. The redundant description previously illustrated in FIGS. 1 through 7 will be substituted by the earlier description.

Figure 8:
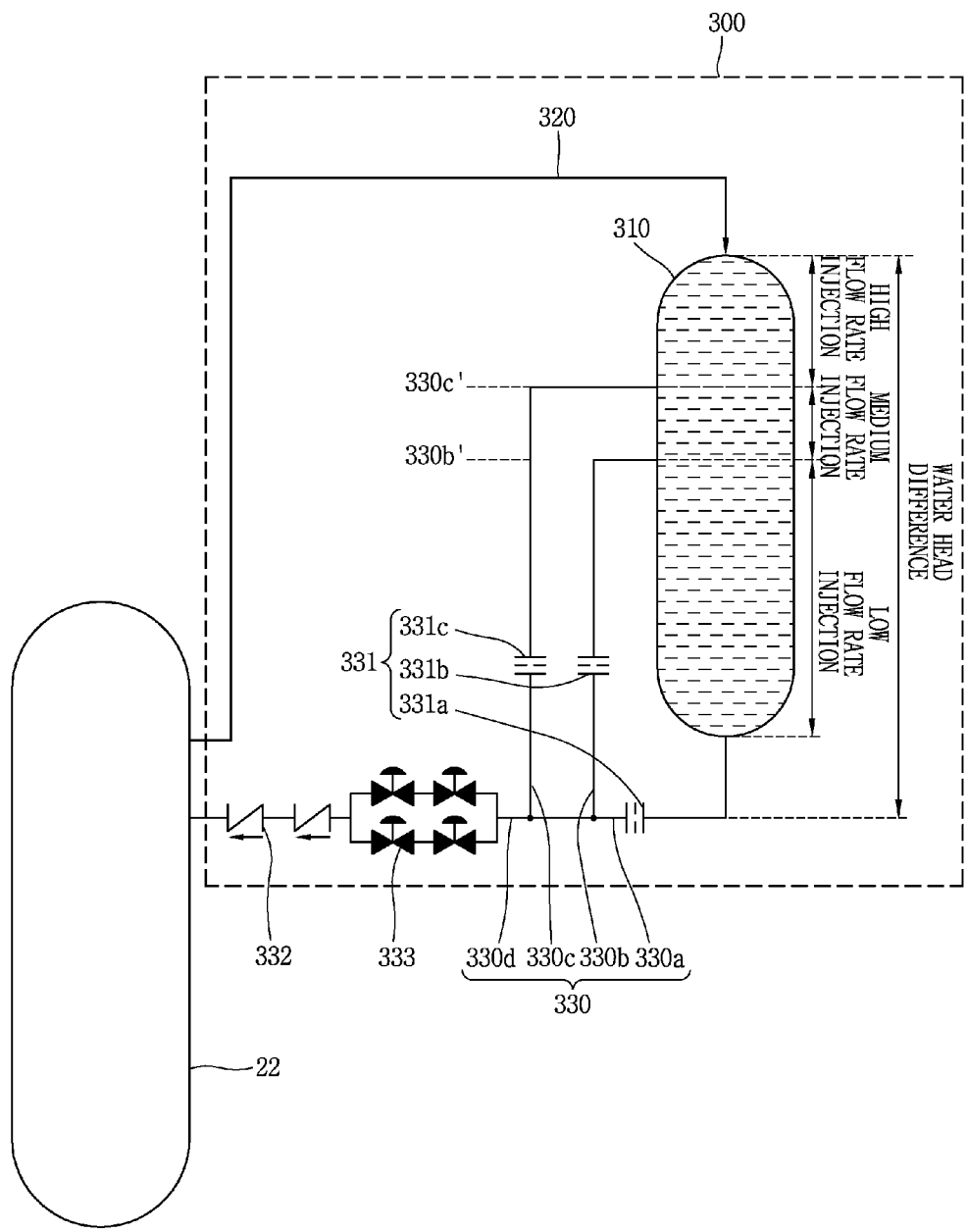
FIG. 8 is a conceptual view illustrating a multi stage safety injection device associated with another embodiment of the present disclosure.

FIG. 8 is a conceptual view illustrating the multi stage safety injection device 300 associated with another embodiment of the present disclosure.

The multi stage safety injection device 300 is formed to inject coolant into the reactor vessel 22 when an accident occurs, and may include a safety injection tank 310, a pressure balance line 320, and a safety injection line 330.

The safety injection tank 310 is formed to accommodate coolant to be injected into the reactor vessel 22 when an accident occurs in which the pressure or water level of the reactor vessel 22 is decreased. The safety injection tank 310 is all filled with coolant (boric acid solution).

The pressure balance line 320 is connected to the reactor vessel 22 and safety injection tank 310 to form a pressure balance between the reactor vessel 22 and the safety injection tank 310. It is different from the multi stage safety injection device 100 illustrated in FIG. 1 in that an isolation valve is not installed in the pressure balance line 320. Accordingly, the pressure balance line 320 is always maintained in an open state, and when the pressure of the reactor vessel 22 is changed not only when an accident occurs but also during a normal plant operation, fluid is introduced from the reactor vessel 22 to the safety injection tank 310 to maintain a pressure balance within a short period of time. For the pressure balance line 320, an orifice (not shown) may be installed to limit a flow rate of fluid introduced from the reactor vessel 22 according to the design characteristics.

When a pressure balance between the reactor vessel 22 and the safety injection tank 310 is maintained as described above, the design pressure of the safety injection tank 310 should be designed to be high at a level of the reactor vessel 22.

The safety injection line 330 is connected to the safety injection tank 310 and reactor vessel 22 to inject coolant into the reactor vessel 22 in a pressure balance state between the reactor vessel 22 and the safety injection tank 310 in an accident. A set of safety injection lines 330 are connected to the safety injection tank 310 with different heights to reduce a flow rate of coolant injected into the reactor vessel 22 step by step according to the water level reduction of the safety injection tank 310.

As illustrated in FIG. 8, the safety injection line 330 may include a first safety injection line 330a connected to a lower end part of the safety injection tank 310, a second safety injection line 330b connected to a lateral surface of the safety injection tank 310 at a location higher by a predetermined height from the first safety injection line 330a, and a third safety injection line 330c connected to a lateral surface of the safety injection tank 310 at a location higher by a predetermined height from the second safety injection line 330b.

As coolant is injected into the reactor vessel 22 from the safety injection tank 310 when an accident occurs, the water level of the safety injection tank 310 is gradually decreased. When coolant injection is first started, coolant is injected through the first safety injection line 330a, second safety injection line 330b and third safety injection line 330c. When the coolant level of the safety injection tank 310 is lower than the installation height of the third safety injection line 330c as implementing coolant injection, coolant is no more introduced to the third safety injection line 330c, and coolant is injected only through the first safety injection line 330a and second safety injection line 330b. Then, when coolant is started not to be introduced to the third safety injection line 330c, the injection flow rate of coolant is instantaneously and rapidly decreased.

When the water level of the safety injection tank 310 is lower than the installation height of the second safety injection line 330b as further implementing coolant injection, coolant is no more introduced to the second safety injection line 330b, and coolant is injected only through the first safety injection line 330a. Similarly, when coolant is started not to be introduced to the second safety injection line 330b, the injection flow rate of coolant is instantaneously and rapidly decreased.

An injection flow rate in case where coolant is injected through all the first safety injection line 330a, second safety injection line 330b and third safety injection line 330c may be referred to as a high flow rate of safety injection, and an injection flow rate in case where coolant is injected through the first safety injection line 330a and second safety injection line 330b as a medium flow rate of safety injection, and an injection flow rate in case where coolant is injected only through the first safety injection line 330a as a low flow rate of safety injection. A high, a medium and a low flow rate are relative values, respectively, and may be differently designed according to the size of the safety injection tank 310, the installation height of the safety injection lines 330, and the flow resistance of each of the safety injection lines 330.

The orifice 331 is installed in the safety injection line 330 to act as a flow resistance. For a high, a medium and a low flow rate of safety injection of the multi stage safety injection device 300, the orifice 331 forms a suitable flow resistance based on the required characteristics of a reactor according to the installation height of the safety injection line 330 connected to the safety injection tank 310, thereby injecting coolant at a suitable flow rate. The flow resistance of a first orifice 331a is set to a low flow rate condition when the first safety injection line 330a is operated in a single mode in FIG. 8, and the flow resistance of a second orifice 331b is set to a medium flow rate condition when the first safety injection line 330a and second safety injection line 330b are operated at the same time, and the flow resistance of a third orifice 331c is set to a high flow rate condition when the first safety injection line 330a, second safety injection line 330b and third safety injection line 330c are operated at the same time.

Accordingly, when implementing a high flow rate of safety injection, coolant injected through the third safety injection line 330c, second safety injection line 330b and first safety injection line 330a is larger than that through the first safety injection line 330a and second safety injection line 330b, and when implementing a medium flow rate of safety injection, coolant injected through the second safety injection line 330b and first safety injection line 330a is larger than that through the first safety injection line 330a.

The reason of forming the orifice 331 with different flow resistances is to provide a high, medium and low flow rate stages of safety injection and different periods of time required for coolant injection. A relatively high flow rate of coolant should be rapidly injected when an accident occurs whereas a relatively low flow rate of coolant is required to be injected for a long period of time at the middle and late stages of the accident.

In the multi stage safety injection device 300, the orifices 331 are formed to have different flow resistances, and thus designed to adjust the injection amount and injection time of coolant required for a flow of time subsequent to the consequence of a reactor accident.

An isolation valve 333 is provided in a safety injection line 330d into which the first safety injection line 330a, second safety injection line 330b and third safety injection line 330c are merged. The isolation valve 333 is maintained in a closed state in a normal plant operation to block coolant from being introduced from the safety injection tank 310 into the reactor vessel 22. The isolation valve 333 is open by a control signal of the relevant system when an accident occurs. The reactor vessel 22 and safety injection tank 310 have been in a pressure balance state, and thus coolant injection is started from the safety injection tank 310 along with the opening of the isolation valve 333.

The isolation valve 333 may be designed to receive backup by a battery or the like to be prepared for power loss (AC), and a plurality of isolation valves 333 may be installed for a plurality of branch lines 334, respectively, to prevent the operation of the entire multi stage safety injection device 300 from being stopped due to a single failure of the isolation valves. In some embodiments, a check valve 332 is installed between the reactor vessel 22 and safety injection tank 310.

Figure 9:
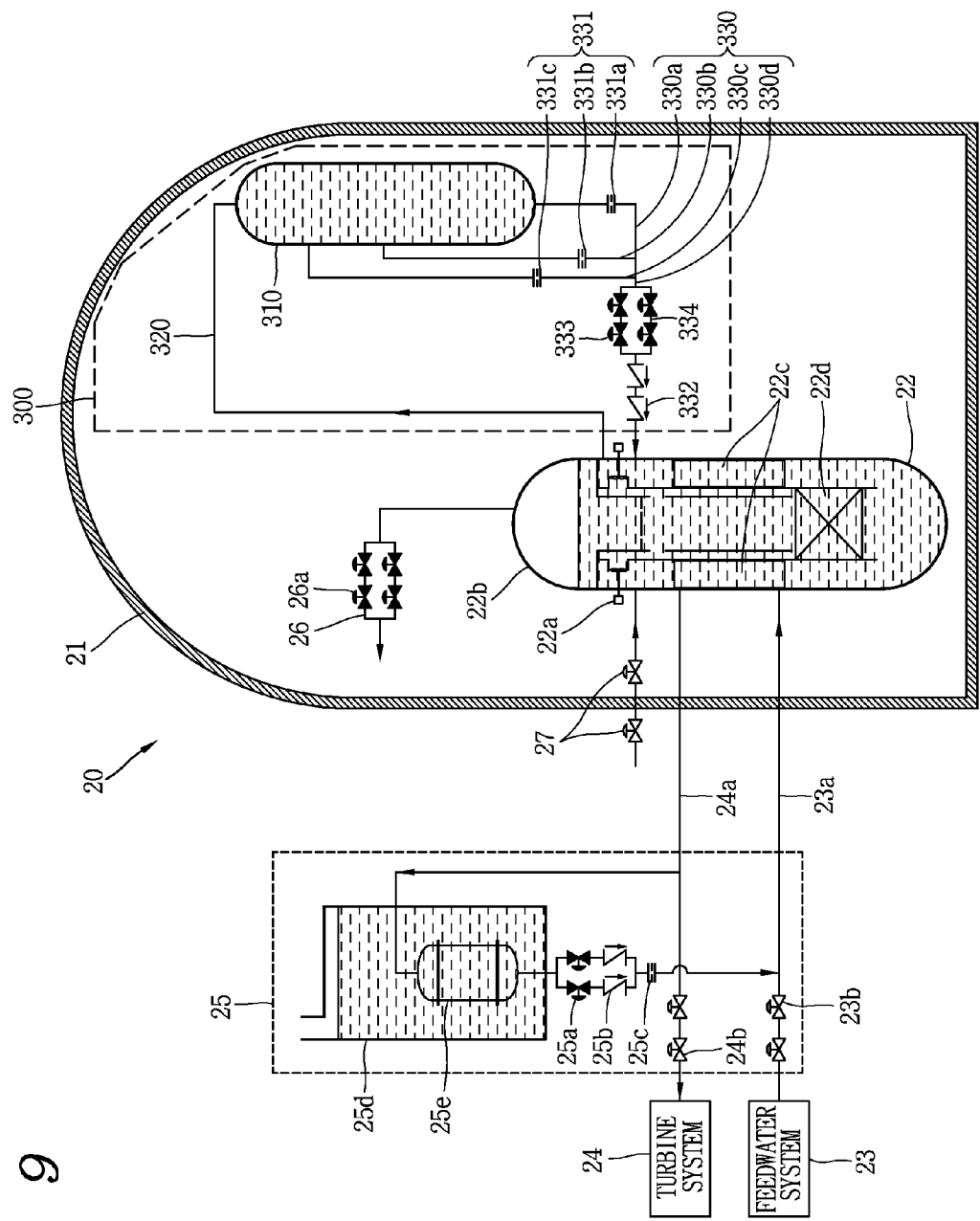
FIG. 9 is a conceptual view illustrating the normal plant operation state of an integral reactor installed with a multi stage safety injection device illustrated in FIG. 8.

FIG. 9 is a conceptual view illustrating the normal plant operation state of an integral reactor installed with the multi stage safety injection device 300 illustrated in FIG. 8.

The multi stage safety injection device 300 is installed within a containment building 21 of the integral reactor 20, and connected by the pressure balance line 320 and safety injection line 330. The safety injection tank 310, composed of multi trains generally, is installed at a location higher than that of the reactor vessel 22 for coolant injection due to a gravitational head of water. During a normal plant operation, an isolation valve is in a closed state in the multi stage safety injection device 300.

The integral reactor 20 illustrated in FIG. 9 is different from the integral reactor 10 illustrated in FIG. 2 in that the core makeup tank does not exist, and the safety injection line 330 of the multi stage safety injection device 300 is added, and the isolation valve 333 is installed in the safety injection line 330 other than the pressure balance line 320.

The safety injection tank 310 is connected to the reactor vessel 22 through the pressure balance line 320, and the pressure balance line 320 is always open, the design pressure of the safety injection tank 310 is high at a level of the reactor vessel 22. Accordingly, the safety injection tank 310 designed with a high pressure is in charge of the function of the core makeup tank that has injected a high flow rate of coolant to the reactor vessel 22 when an accident occurs in FIG. 2. Three safety injection lines 330 are installed therein for a high, a medium and a low flow rate of multi stage safety injections.

For the integral reactor 20, the reactor vessel 22 is disposed within a containment building (container) 21. For the integral reactor 20, main components such as reactor coolant pumps 22a, a pressurizer 22b, steam generators 22c, and the like are installed within the reactor vessel 22 as described above.

Water is supplied to the steam generator 22c through a feedwater line 23a from the feedwater system 23 located out of the containment building 21, and water receives energy from nuclear fission produced in the core 22d to become high temperature and high pressure steam, and moves to a turbine system 24 located out of the containment building 21 through a steam line 24a. During a normal plant operation, isolation valves 23b, 24b installed in the feedwater line 23a and steam line 24a are in an open state.

A passive residual heat removal system 25 is installed out of the containment building 21, and connected to the steam line 24a and feedwater line 23a to remove heat from the reactor vessel 22 when an accident occurs. However, during a normal plant operation of the integral reactor 20, an isolation valve 25a is maintained in a closed state.

An automatic depressurization system 16 is installed within the containment building 21, and connected to the reactor vessel 22 to reduce a pressure of the reactor vessel 22 when an accident occurs. However, in the automatic depressurization system 26, the automatic depressurization valves 26a are also maintained in a closed state during a normal plant operation of the integral reactor 20 similarly to the passive residual heat removal system 25.

During a normal plant operation of the integral reactor 10, a containment building isolation valve 27 is in an open state, and the passive safety injection system 300, passive residual heat removal system 25 and automatic depressurization system 26 do not operate.

Figure 10:
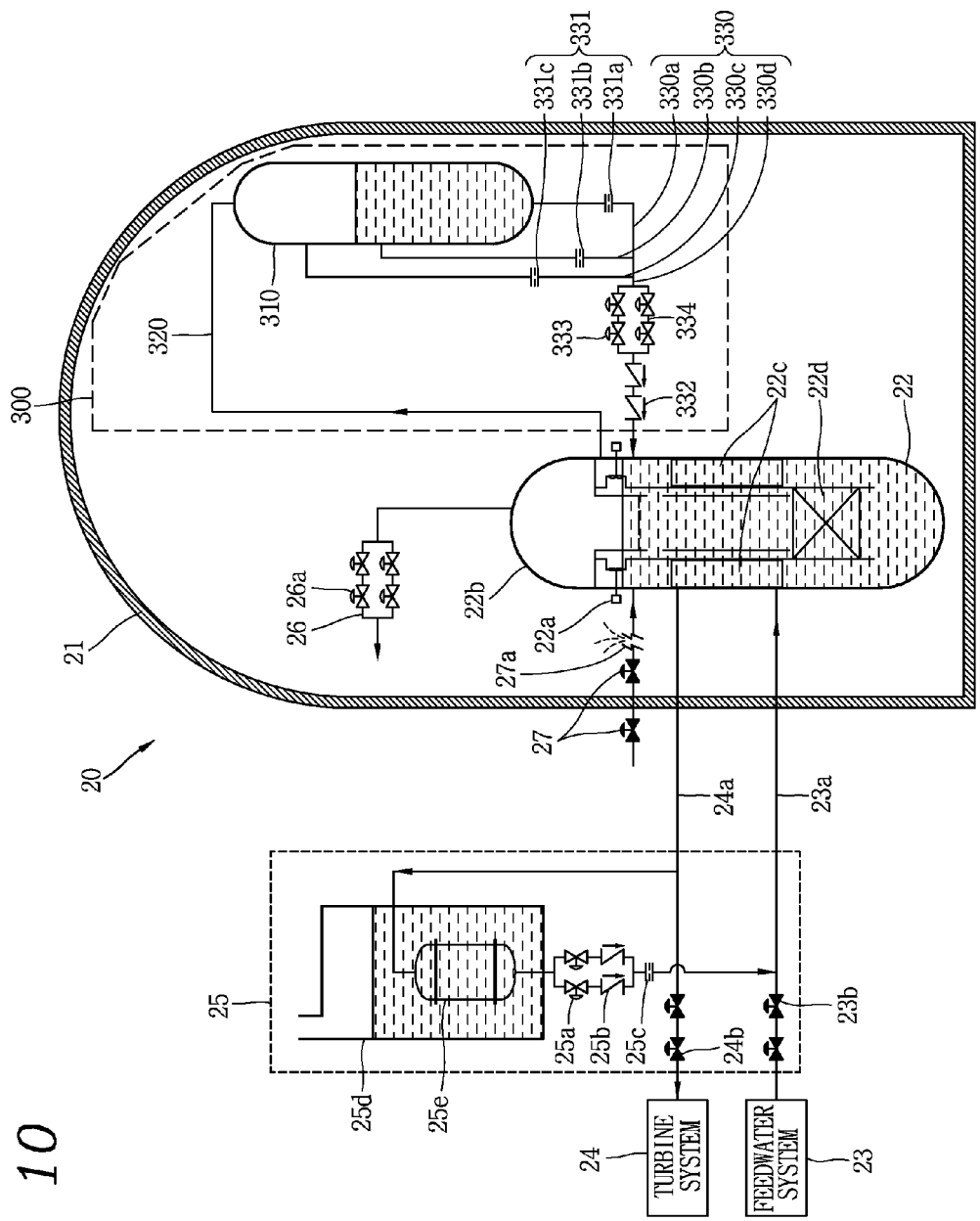
FIG. 10 is a conceptual view illustrating the operation of a safety facility when a loss of coolant accident occurs in the integral reactor illustrated in FIG. 9.

FIG. 10 is a conceptual view illustrating the operation of a safety facility when a loss of coolant accident occurs in the integral reactor 20 illustrated in FIG. 9.

When a loss of coolant accident such as line fracture 27a or the like occurs and the pressure or water level of the reactor vessel 22 is reduced, the isolation valve 333 installed in the safety injection line 330 is open by a control signal of the relevant system, and safety injection is started from the multi stage safety injection device 300 into the reactor vessel 22.

The coolant level of the safety injection tank 310 is between the second safety injection line 330b and third safety injection line 330c in FIG. 10, and thus coolant is no more injected into the third safety injection line 330c, and through this it is seen that a high flow rate of safety injection stage has been already finished. Safety injection is carried out through the first safety injection line 330a and second safety injection line 330b, and therefore, FIG. 10 illustrates a medium flow rate of safety injection stage.

Figure 11:
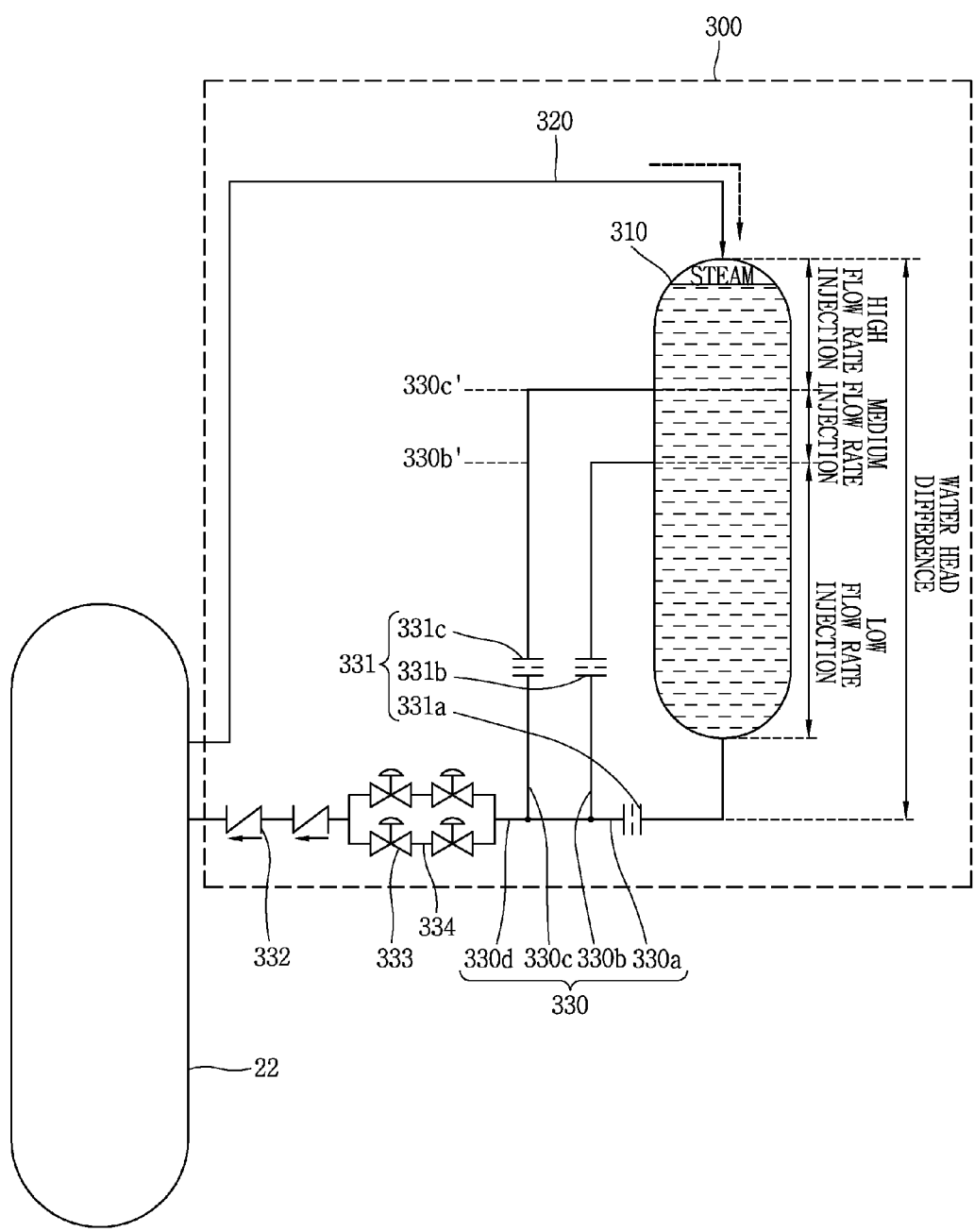
FIG. 11 is a conceptual view illustrating a pressure balance step when a loss of coolant accident occurs in the multi stage safety injection device illustrated in FIG. 8.

FIG. 11 is a conceptual view illustrating the pressure balance step when a loss of coolant accident occurs in the multi stage safety injection device 300 illustrated in FIG. 8.

When a control signal is generated by the relevant system when an accident occurs, the isolation valve 333 installed in the safety injection line 330 is open by the control signal, and the safety injection of coolant due to a gravitational head of water is started. Fluid is introduced from the reactor vessel 22 into the safety injection tank 310 through the pressure balance line 320, and thus the reactor vessel 22 and safety injection tank 310 maintains a pressure balance state.

Figure 12:
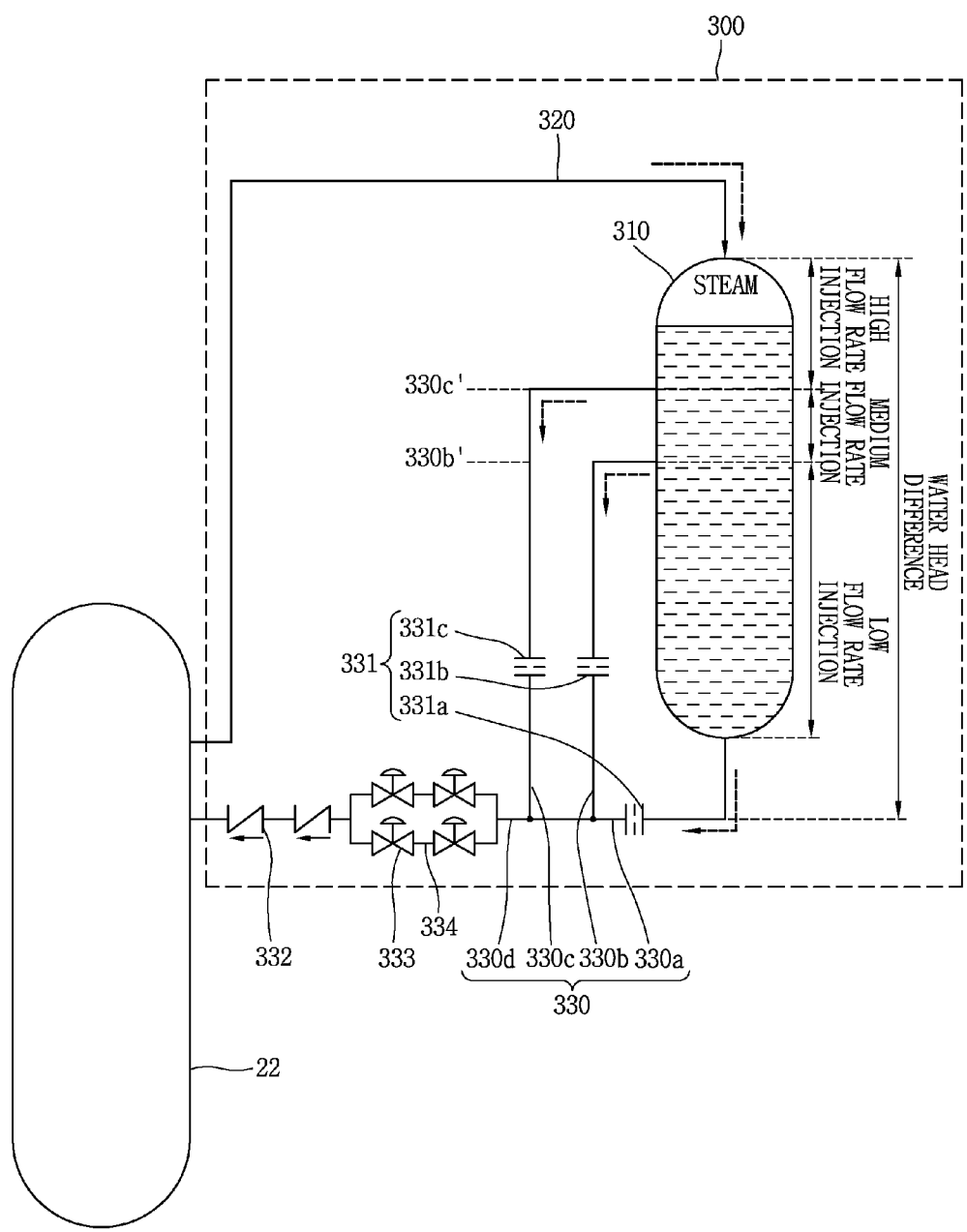
FIG. 12 is a conceptual view illustrating a coolant injection step (high flow rate of injection step) in a multi stage safety injection device subsequent to FIG. 11.

FIG. 12 is a conceptual view illustrating a coolant injection step (high flow rate of injection step) in the multi stage safety injection device 300 subsequent to FIG. 11.

When an accident occurs, coolant within the safety injection tank 310 is injected into the reactor vessel 22 through the first safety injection line 330a, second safety injection line 330b and third safety injection line 330c. Total flow resistance decreases in the case of injecting coolant through three passages of the first safety injection line 330a, second safety injection line 330b and third safety injection line 330c compared to the case of injecting coolant through only one passage of the first safety injection line 330a, and therefore, a high flow rate of coolant is injected into the reactor vessel 22 when an accident occurs.

A gravitational head of water is gradually decreased by the water level reduction of coolant until the coolant level of the safety injection tank 310 is reduced than the installation height 330c' of the third safety injection line 330c, and therefore a flow rate of coolant injection is gradually reduced. Then, a flow rate of coolant injection is instantaneously and rapidly reduced at a moment at which the coolant level of the safety injection tank 310 is reduced lower than the installation height 330c' of the third safety injection line 330c.

Figure 13:
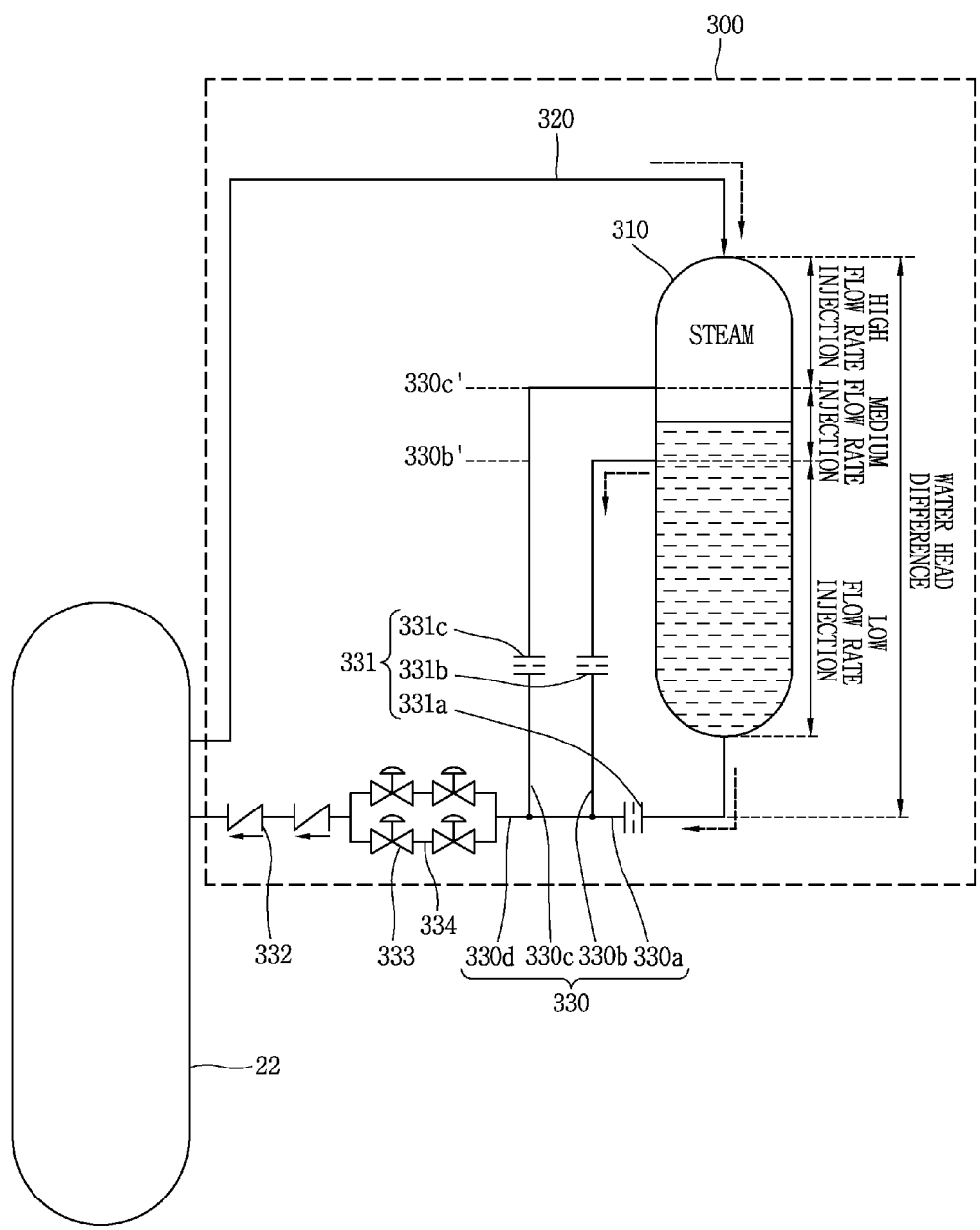
FIG. 13 is a conceptual view illustrating a coolant injection step (medium flow rate of injection step) in a multi stage safety injection device subsequent to FIG. 12.

FIG. 13 is a conceptual view illustrating a coolant injection step (medium flow rate of injection step) in the multi stage safety injection device 300 subsequent to FIG. 12.

The coolant level of the safety injection tank 310 is reduced lower than the installation height 330c' of the third safety injection line 330c, and therefore coolant is not injected through the third safety injection line 330c, but a medium flow rate of safety injection is carried out through the first safety injection line 330a and second safety injection line 330b.

The coolant level of the safety injection tank 310 is continuously reduced while implementing a medium flow rate of safety injection, and the amount of coolant injection from the safety injection tank 310 into the reactor vessel 22 is gradually decreased. At a moment at which the coolant level of the safety injection tank 310 is reduced than the installation height 330b' of the second safety injection line 330b, coolant is no more introduced through the second safety injection line 330b and a flow rate of coolant injected into the reactor vessel 22 is instantaneously and rapidly reduced.

Figure 14:
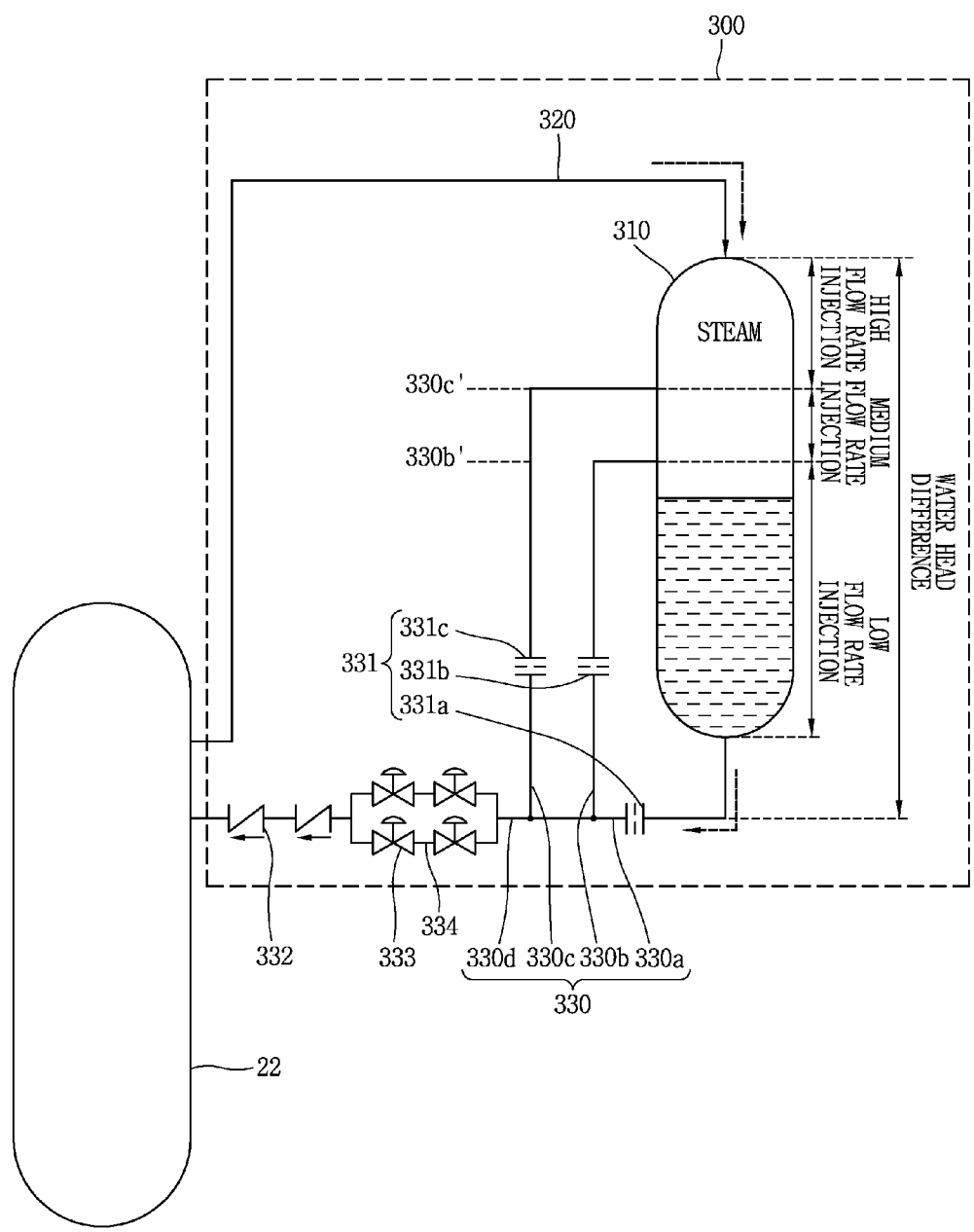
FIG. 14 is a conceptual view illustrating a coolant injection step (low flow rate of injection step) in a multi stage safety injection device subsequent to FIG. 13.

FIG. 14 is a conceptual view illustrating a coolant injection step (low flow rate of injection step) in the multi stage safety injection device 300 subsequent to FIG. 13.

The water level of the safety injection tank 310 is reduced lower than the installation height 330b' of the second safety injection line 330b, and therefore safety injection from the safety injection tank 310 into the reactor vessel 22 is carried out only through the first safety injection line 330a, thereby implementing a low flow rate of safety injection.

A flow resistance in the case of implementing coolant injection only through one passage of the first safety injection line 330a is relatively greater than that in the case of implementing coolant injection through two passages of the first safety injection line 330a and second safety injection line 330b or the case of implementing coolant injection through three passages of the first safety injection line 330a, second safety injection line 330b and third safety injection line 330c, and therefore a low flow rate of safety injection can be carried out for a long period of time. The low flow rate of safety injection continues until almost of the coolant of the safety injection tank 310 is injected into the reactor vessel 22, and the injection time can be adjusted according to the design of the safety injection tank 310. At present, a time required for the operation of a safety system with no operator's action or emergency AC power in the passive reactor 20 is about 72 hours.

Figure 15:
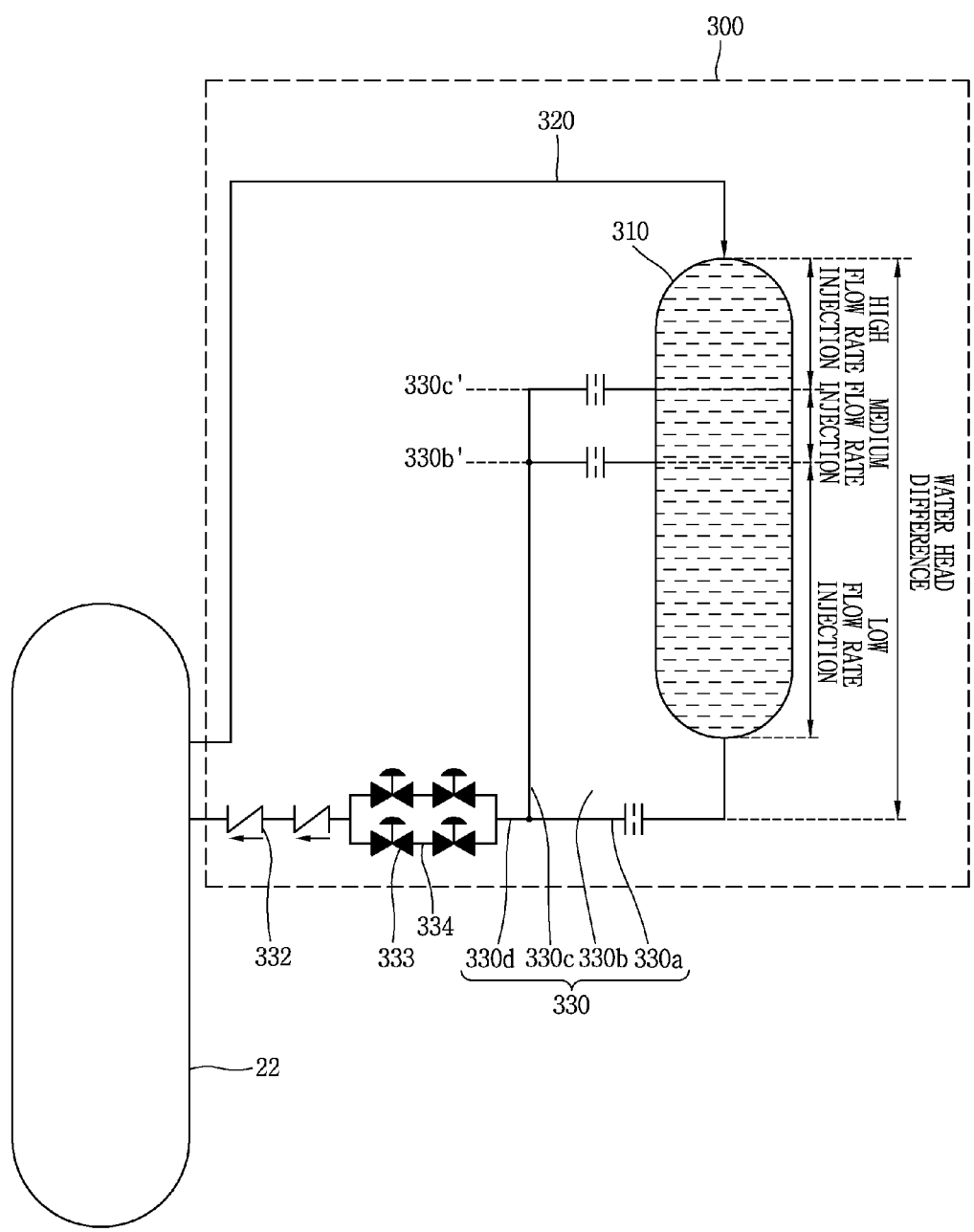
FIG. 15 is a conceptual view illustrating a modified example of a multi stage safety injection device illustrated in FIG. 8.

FIG. 15 is a conceptual view illustrating a modified example of the multi stage safety injection device illustrated in FIG. 8.

The multi stage safety injection device 300 has the same configuration as that of the multi stage safety injection device 300 illustrated in FIG. 8, but it is different from FIG. 8 in that the third safety injection line 330c is first merged to the second safety injection line 330b prior to being merged to the safety injection line 330d in the multi stage safety injection device 300 illustrated in FIG. 15.

Figure 16:
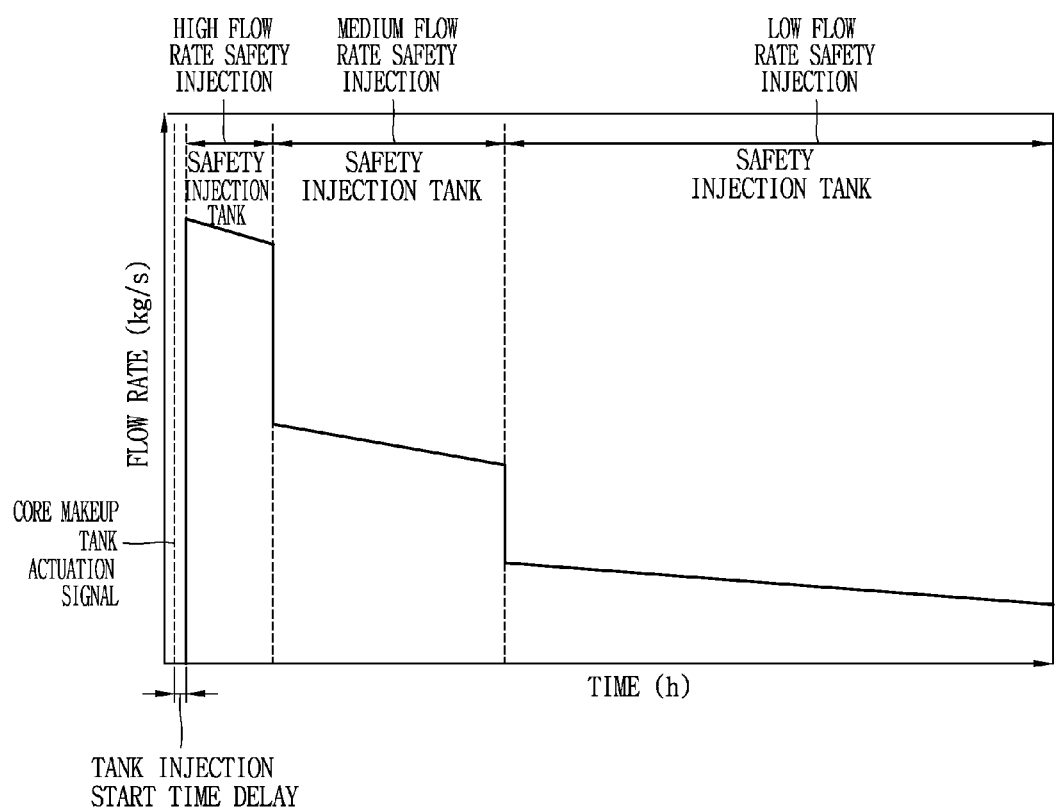
FIG. 16 is a graph illustrating an injection flow rate of coolant in time in a multi stage safety injection device described in FIGS. 8 through 15.

FIG. 16 is a graph illustrating an injection flow rate of coolant in time in the multi stage safety injection device 300 described in FIGS. 8 through 15.

A high, a medium and a low flow rate of safety injection are all carried out from the safety injection tank in the multi stage safety injection device to inject a high flow rate of coolant within a short period of time when an accident occurs. Subsequently, a medium flow rate of safety injection is carried out at the early and middle stages of the accident to implement safety injection for a longer period of time than that of the high flow rate stage. Finally, a low flow rate of safety injection is carried out for a long period of time while smoothly decreasing the injection speed thereof at the middle and late stages of the accident.

The multi stage safety injection of coolant by means of a multi stage safety injection device may implement flow rate switching in a state that a pressure balance between the reactor vessel and the safety injection tank has been made, and therefore, coolant may be continuously and successively injected without causing a problem of delay or overlap in the coolant injection during the process of flow rate switching as shown in FIG. 16.

The foregoing multi stage safety injection device may inject coolant with a single safety injection tank in multiple stages according to the safety injection characteristics required for a reactor. Accordingly, a reactor having the multi stage safety injection device may effectively use coolant within the safety injection tank and thus additional safety injection facilities may not be required for each pressure condition, thereby simplifying facilities as well as reducing the economic cost.

The present disclosure can be applied to not only a integral reactor but a loop type reactor for changing a performance of the core makeup tank to multi stage. In the loop type reactor, a reactor vessel correspond to a reactor coolant system.

A passive safety injection system including a multi stage safety injection device may be formed with a fully passive type, and thus safety functions can be carried out only using natural forces contained in the system, such as gas pressure or gravity force, without using an active device such as a pump and also without an operator's action for a period of time required for the passive system when an accident occurs. Therefore, an emergency AC power system is not required, which enhances the reliability of the safety injection system and enhances the safety of a reactor.

The configurations and methods according to the above-described embodiments will not be applicable in a limited way to the foregoing multi stage safety injection device and passive safety injection system having the same, and all or part of each embodiment may be selectively combined and configured to make various modifications thereto.

According to the present disclosure having the foregoing configuration, it may be possible to simplify various safety injection facilities used in a complicated manner due to the required safety injection characteristics of a reactor as a single type facility.

Furthermore, according to the present disclosure, the flow rate of coolant injected into the reactor vessel may be decreased step by step according to the water level reduction of the safety injection tank subsequent to starting coolant injection, and thus coolant can be injected only with a single type facility according to the required safety injection characteristics of a reactor being varied according to the passage of time subsequent to an accident.

The invention claimed is:

1. A multi stage safety injection device, comprising:
a safety injection tank formed to contain coolant to be injected into a reactor vessel by a gravitational head of said coolant when an accident occurs in which the pressure or water level of the reactor vessel is decreased;
a pressure balance line connected to the reactor vessel and to the safety injection tank to provide a pressure balance between the reactor vessel and the safety injection tank; and
a set of safety injection lines connected to the safety injection tank at different heights that connect the safety injection tank and the reactor vessel to inject coolant to the reactor vessel in a pressure balance state between the reactor vessel and the safety injection tank, thereby passively reducing the flow rate of coolant injected into the reactor vessel step by step according to the coolant level reduction in the safety injection tank; and
a plurality of orifices configured to passively form a total flow resistance being increased step by step according to the coolant level reduction of the safety injection tank to decrease the flow rate of coolant injected into the reactor vessel,
wherein the pressure balance line is always maintained in an open state to maintain the pressure balance between the reactor vessel and the safety injection tank,
wherein the plurality of orifices comprise:
a first orifice configured to passively form a flow resistance to decrease the flow rate of coolant injected into the reactor vessel through the first safety injection line, and
a second orifice configured to passively form a flow resistance to decrease the flow rate of coolant injected into the reactor vessel through the second safety injection line, and wherein the set of safety injection lines comprise:
a first safety injection line connected to a lower end part of the safety injection tank to continuously provide an injection passage for coolant filled within the safety injection tank into the reactor vessel, and
a second safety injection line connected to the safety injection tank at a location higher by a predetermined height from the first safety injection line to provide an injection passage for coolant until the coolant level of the safety injection tank becomes lower than said predetermined height.

2. The multi stage safety injection device of claim 1, further comprising:
wherein the first safety injection line and the second safety injection line are merged together outside the safety injection tank,
wherein the safety injection lines comprise branch lines disposed between the reactor vessel and a merged portion of the first safety injection line and the second safety injection line, and
the multi stage safety injection device further comprises an isolation valve installed in each of the branch lines to block the flowing of coolant from the safety injection tank to the reactor vessel in a pressure balanced state with the reactor vessel during a normal plant operation, and designed to be opened by a control signal generated from the pressure or water level reduction of the reactor vessel to implement coolant injection from the safety injection tank to the reactor vessel when an accident occurs.

3. A passive safety injection system, comprising:
a core makeup tank connected to a reactor vessel to maintain a pressure balance state with the reactor vessel and inject coolant to the reactor vessel when an accident occurs in which the pressure or water level of the reactor vessel is decreased; and
a multi stage safety injection device connected to the reactor vessel to inject coolant by passively reducing the flow rate of injection step by step to the reactor vessel at a pressure lower than that of the core makeup tank following the injection from the core makeup tank,
wherein the multi stage safety injection device comprises:
a safety injection tank formed to contain coolant to be injected into a reactor vessel by a gravitational head of said coolant when an accident occurs in which the pressure or water level of the reactor vessel is decreased;

a pressure balance line connected to the reactor vessel and the safety injection tank to form a pressure balance between the reactor vessel and the safety injection tank; and a set of safety injection lines connected to the safety injection tank at different heights that connect the reactor vessel to inject coolant to the reactor vessel in a pressure balance state between the reactor vessel and the safety injection tank to reduce a flow rate of coolant injected into the reactor vessel step by step according to the coolant level reduction of the safety injection tank; and a plurality of orifices configured to passively form a total flow resistance being increased step by step according to the coolant level reduction of the safety injection tank to decrease the flow rate of coolant injected into the reactor vessel, wherein the pressure balance line is always maintained in an open state to maintain the pressure balance between the reactor vessel and the safety injection tank, wherein the plurality of orifices comprise:
  a first orifice configured to passively form a flow resistance to decrease the flow rate of coolant injected into the reactor vessel through the first safety injection line, and
  a second orifice configured to passively form a flow resistance to decrease the flow rate of coolant injected into the reactor vessel through the second safety injection line, and wherein the set of safety injection lines comprise:
  a first safety injection line connected to a lower end part of the safety injection tank to continuously provide an injection passage for coolant filled within the safety injection tank into the reactor vessel, and
  a second safety injection line connected to the safety injection tank at a location higher by a predetermined height from the first safety injection line to provide an injection passage for coolant until the coolant level of the safety injection tank becomes lower than said predetermined height.

4. The multi stage safety injection device of claim 1, wherein the flow rate through the first orifice and the flow rate through the second orifice are passively limited, and
  wherein the first safety injection line and the second injection line contain no isolation valves configured to be open by a signal generated from the pressure or water level reduction of the reactor vessel.

5. The multi stage safety injection device of claim 3, wherein the flow rate through the first orifice and the flow rate through the second orifice are passively limited, and
  wherein the first safety injection line and the second injection line contain no isolation valves configured to be open by a signal generated from the pressure or water level reduction of the reactor vessel.

6. The multi stage safety injection device of claim 1, further comprising at least one check valve in a portion of the safety injection lines which the first safety injection line and the second safety injection line are merged.

7. The multi stage safety injection device of claim 3, further comprising at least one check valve in a portion of the safety injection lines which the first safety injection line and the second safety injection line are merged.

* * * * *